(12) United States Patent
Takeuchi

(10) Patent No.: US 10,915,091 B2
(45) Date of Patent: Feb. 9, 2021

(54) THREE-DIMENSIONAL SHAPE INFORMATION GENERATING SYSTEM, THREE-DIMENSIONAL SHAPE FORMING APPARATUS, THREE-DIMENSIONAL SHAPE INFORMATION GENERATING METHOD, AND PROGRAM

(71) Applicant: Sony Corporation, Tokyo (JP)

(72) Inventor: Yuichiro Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 521 days.

(21) Appl. No.: 15/575,887

(22) PCT Filed: Apr. 7, 2016

(86) PCT No.: PCT/JP2016/061457
§ 371 (c)(1),
(2) Date: Nov. 21, 2017

(87) PCT Pub. No.: WO2016/194472
PCT Pub. Date: Dec. 8, 2016

(65) Prior Publication Data
US 2018/0173202 A1 Jun. 21, 2018

(30) Foreign Application Priority Data
Jun. 3, 2015 (JP) .................... 2015-113049

(51) Int. Cl.
*A01G 9/02* (2018.01)
*G05B 19/4099* (2006.01)
(Continued)

(52) U.S. Cl.
CPC .......... *G05B 19/4099* (2013.01); *A01G 9/02* (2013.01); *A01G 9/029* (2018.02); *A01G 24/30* (2018.02);
(Continued)

(58) Field of Classification Search
CPC ........ A01G 9/02; A01G 9/029; A01G 9/0293; A01G 24/00; A01G 24/30; A01G 24/40;
(Continued)

(56) References Cited

U.S. PATENT DOCUMENTS 5,059,359 A * 10/1991 Hull ..................... G01J 1/4257
264/401
5,087,400 A 2/1992 Theuveny
(Continued)

FOREIGN PATENT DOCUMENTS

CN 101193548 A 6/2008
JP 2-502879 A 9/1990
(Continued)

OTHER PUBLICATIONS

Extended European Search Report dated Mar. 27, 2019 in connection with European Application No. 16802909.8.
(Continued)

*Primary Examiner* — David J Parsley
*Assistant Examiner* — Danielle A Clerkley
(74) *Attorney, Agent, or Firm* — Wolf, Greenfield & Sacks, P.C.

(57) ABSTRACT

A three-dimensional shape information generating system, a three-dimensional shape forming apparatus, a three-dimensional shape information generating method, and a program, each of which is capable of forming a three-dimensional-shaped object that has an arbitrary outer shape and is used to cultivate plants.

18 Claims, 19 Drawing Sheets

(51) Int. Cl.

| | |
|---|---|
| *B33Y 50/02* | (2015.01) |
| *B33Y 50/00* | (2015.01) |
| *B33Y 30/00* | (2015.01) |
| *B29C 67/00* | (2017.01) |
| *A01G 9/029* | (2018.01) |
| *A01G 24/44* | (2018.01) |
| *A01G 24/30* | (2018.01) |
| *A01G 24/60* | (2018.01) |

(52) U.S. Cl.
CPC ............ *A01G 24/44* (2018.02); *A01G 24/60* (2018.02); *B29C 67/00* (2013.01); *B33Y 30/00* (2014.12); *B33Y 50/00* (2014.12); *B33Y 50/02* (2014.12)

(58) Field of Classification Search
CPC ........ A01G 24/44; A01G 24/48; A01G 24/60; B33Y 30/00; B33Y 50/00; B33Y 50/02; B33Y 80/00; G05B 19/4099
USPC ........ 47/33, 45, 58.1 R, 65.5, 65.7, 66.7, 78
See application file for complete search history.

(56) References Cited

U.S. PATENT DOCUMENTS

| | | | | |
|---|---|---|---|---|
| 5,137,662 | A * | 8/1992 | Hull | G01J 1/4257 |
| | | | | 118/620 |
| 7,117,634 | B2 | 10/2006 | Pelton | |
| 10,538,725 | B1 * | 1/2020 | Natarajan | C12M 33/00 |
| 10,596,660 | B2 * | 3/2020 | McCarthy | A61L 27/56 |
| 2009/0126266 | A1 | 5/2009 | Mulder | |
| 2011/0232188 | A1 | 9/2011 | Kennedy | |
| 2014/0324204 | A1 * | 10/2014 | Vidimce | B29C 67/0088 |
| | | | | 700/98 |
| 2016/0243762 | A1 * | 8/2016 | Fleming | C03C 25/24 |

FOREIGN PATENT DOCUMENTS

| | | |
|---|---|---|
| JP | 2005-074931 A | 3/2005 |
| JP | 2005-185115 A | 7/2005 |
| JP | 2008-148632 A | 7/2008 |
| JP | 2008-536512 A | 9/2008 |
| JP | 2012-501649 A | 1/2012 |
| WO | WO 2006/112700 A1 | 10/2006 |
| WO | WO 2010/028037 A2 | 3/2010 |
| WO | WO 2013/172102 A1 | 11/2013 |

OTHER PUBLICATIONS

Johnson, D., A Device that makes 3D Printing and Scanning Simple—CBS News, https://web.archive.org/web/20150111060023/https://www.cbsnews.com/news/da-vinci-1-0-aio-makes-3d-printing-and-scanning-simple/, retrieved on Mar. 18, 2019, dated Nov. 6, 2014, 3 pages.

No Author Listed, NTU Start-up Launches Singapore's First 3D Printer-Cum-Scanner, https://web.archive.org/web/20140818174735/https://phys.org/news/2014-08-ntu-start-up-singapore-3d-printer-cum-scanner.html, retrieved on Mar. 18, 2019, dated Aug. 13, 2014, 9 pages.

International Search Report and Written Opinion and English translation thereof dated Jun. 21, 2016 in connection with International Application No. PCT/JP2016/061457.

International Preliminary Report on Patentability and English translation thereof dated Dec. 14, 2017 in connection with International Application No. PCT/JP2016/061457.

Khoshnevis B., Automated construction by contour crafting—related robotics and information technologies, Automation in Construction, 2004, vol. 13, pp. 5-19.

Khoshnevis B., Automated Construction by Contour Crafting—Related Robotics, Journal of Automation in Construction—Special Issue: The best of ISARC 2002, vol. 13, Issue 1, Jan. 2004, pp. 5-19.

Chinese Office Action dated Jun. 28, 2019 in connection with Chinese Application No. 201680030069.6, and English translation thereof.

* cited by examiner

FIG.9
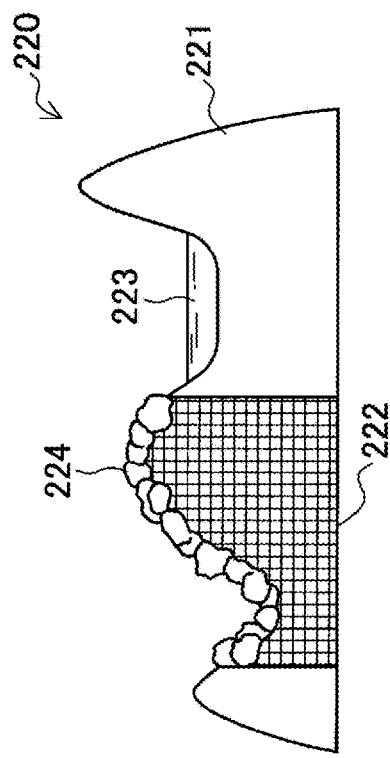
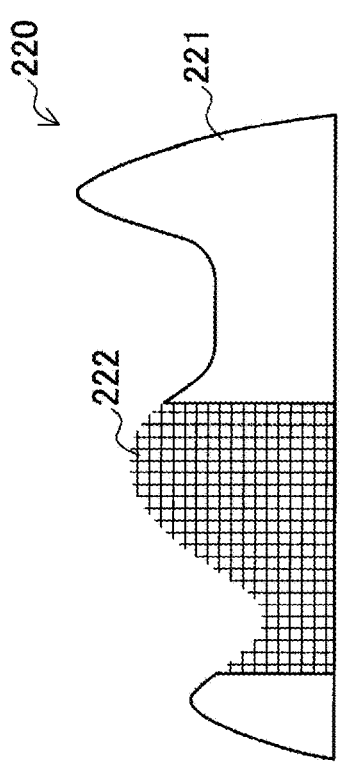

THREE-DIMENSIONAL SHAPE INFORMATION GENERATING SYSTEM, THREE-DIMENSIONAL SHAPE FORMING APPARATUS, THREE-DIMENSIONAL SHAPE INFORMATION GENERATING METHOD, AND PROGRAM

CROSS-REFERENCE TO RELATED APPLICATIONS

This application claims the benefit under 35 U.S.C. § 371 as a U.S. National Stage Entry of International Application No. PCT/JP2016/061457, filed in the Japanese Patent Office as a Receiving Office on Apr. 7, 2016, which claims priority to Japanese Patent Application Number JP2015-113049, filed in the Japanese Patent Office on Jun. 3, 2015, each of which is hereby incorporated by reference in its entirety.

TECHNICAL FIELD

The present disclosure relates to a three-dimensional shape information generating system, a three-dimensional shape forming apparatus, a three-dimensional shape information generating method, and a program.

BACKGROUND ART

In recent years, a 3D printing (three-dimensional modeling) technology capable of forming an arbitrary three-dimensional object has been rapidly developed. Such a 3D printing technology makes it possible to easily form a modeled object having a three-dimensional shape input by a user and can therefore be widely used to, for example, manufacture a design of a product or component for trial and create a model for presentation.

Further, there is studied forming a larger-scale structure by using the above-mentioned 3D printing technology. For example, forming a residence in which a person can live by using the 3D printing technology is studied in Non-Patent Literature 1 cited below.

CITATION LIST

Non-Patent Literature

Non-Patent Literature 1: Khoshnevis, B., Automated Construction by Contour Crafting-Related Robotics and Information Technologies, Journal of Automation in Construction, vol. 13, no. 1, 2004

DISCLOSURE OF INVENTION

Technical Problem

However, in the above-mentioned Non-Patent Literature 1, only an artificial object such as a residence is studied as a three-dimensional-shaped object formed by using the 3D printing technology, and a structure including a natural object such as plants has not been studied. This is because plants need moisture and nourishment to grow and a growth environment is variously restricted, and therefore it is difficult to form a three-dimensional-shaped object that satisfies a growth environment of plants by using the 3D printing technology studied in the above-mentioned Non-Patent Literature 1 or the like.

Therefore, there has been required a technology of forming a three-dimensional-shaped object that satisfies a growth environment of plants, can be used to cultivate plants, and has an arbitrary outer shape.

In view of this, the present disclosure proposes a three-dimensional shape information generating system, a three-dimensional shape forming apparatus, a three-dimensional shape information generating method, and a program, each of which is new, is improved, and is capable of forming a three-dimensional-shaped object that has an arbitrary outer shape and is used to cultivate plants.

Solution to Problem

According to the present disclosure, there is provided a three-dimensional shape information generating system including: a shape information generating unit configured to generate, on the basis of outer shape information indicating an outer shape of a three-dimensional-shaped object used to cultivate a plant, shape information indicating a shape of the three-dimensional-shaped object in which at least a part of a region has a three-dimensional mesh-like structure; and an output unit configured to output the shape information to cause a three-dimensional shape forming unit to form the three-dimensional-shaped object.

In addition, according to the present disclosure, there is provided a three-dimensional shape forming apparatus including: an outer shape information acquiring unit configured to acquire outer shape information indicating an outer shape of a three-dimensional-shaped object used to cultivate a plant; a shape information generating unit configured to generate, on the basis of the outer shape information, shape information indicating a shape of the three-dimensional-shaped object in which at least a part of a region has a three-dimensional mesh-like structure; and a three-dimensional shape forming unit configured to form the three-dimensional-shaped object on the basis of the shape information.

In addition, according to the present disclosure, there is provided a three-dimensional shape information generating method including: generating, by using a circuit, on the basis of outer shape information indicating an outer shape of a three-dimensional-shaped object used to cultivate a plant, shape information indicating a shape of the three-dimensional-shaped object in which at least a part of a region has a three-dimensional mesh-like structure; and outputting the shape information to cause a three-dimensional shape forming unit to form the three-dimensional-shaped object.

In addition, according to the present disclosure, there is provided a program for causing a computer to function as a shape information generating unit configured to generate, on the basis of outer shape information indicating an outer shape of a three-dimensional-shaped object used to cultivate a plant, shape information indicating a shape of the three-dimensional-shaped object in which at least a part of a region has a three-dimensional mesh-like structure.

According to the present disclosure, it is possible to form a three-dimensional-shaped object that has an outer shape indicated by acquired outer shape information and in which at least a part of a region has a three-dimensional mesh-like structure suitable to cultivate plants.

Advantageous Effects of Invention

As described above, according to the present disclosure, it is possible to form a three-dimensional-shaped object that has an arbitrary outer shape and is used to cultivate plants.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is an explanatory view for describing a specific structure in which plants and landscape components are arranged.

MODE(S) FOR CARRYING OUT THE INVENTION

Figure 1:
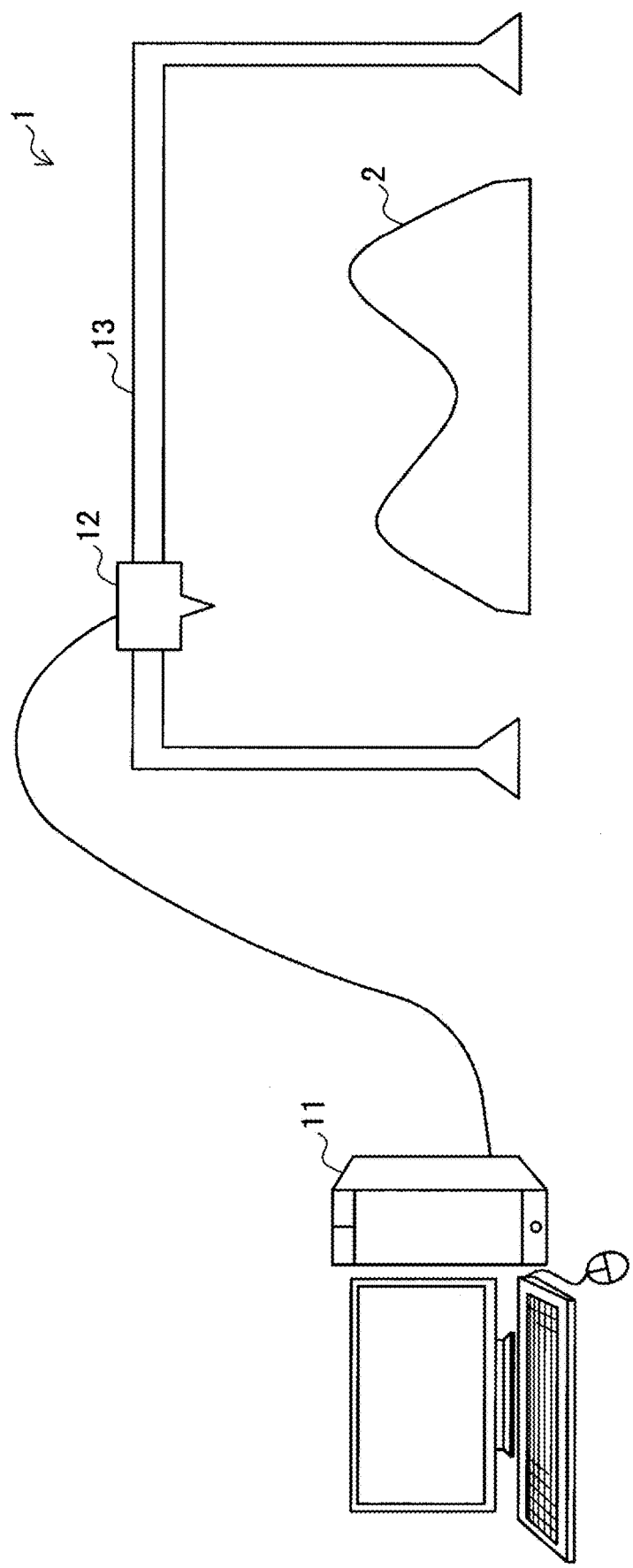
FIG. 1 is a schematic diagram for describing an outline of a three-dimensional shape forming system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. First Embodiment
1.1. Outline of three-dimensional shape forming system
1.2. Configuration example of three-dimensional shape forming system
1.3. Operation example of three-dimensional shape forming system
2. Second Embodiment
2.1. Configuration example of three-dimensional shape forming system
2.2. Operation example of three-dimensional shape forming system
3. Third Embodiment
3.1. Configuration example of three-dimensional shape forming system
3.2. Operation example of three-dimensional shape forming system
4. Hardware configuration
5. Conclusion

1. First Embodiment

[1.1. Outline of Three-Dimensional Shape Forming System]

First, an outline of a three-dimensional shape forming system according to a first embodiment of the present disclosure will be described with reference to FIG. 1. FIG. 1 is a schematic diagram for describing an outline of a three-dimensional shape forming system 1 according to the present embodiment.

As shown in FIG. 1, the three-dimensional shape forming system 1 is a system that includes an information processing apparatus 11 serving as a three-dimensional shape information generating system, a printer apparatus 12, and a rail 13 and is capable of forming a three-dimensional-shaped object 2 having an arbitrary three-dimensional shape. Further, the three-dimensional-shaped object 2 is used to cultivate plants.

The information processing apparatus 11 generates shape information indicating a shape of the three-dimensional-shaped object 2 formed by the printer apparatus 12. Specifically, the information processing apparatus 11 first generates shape information indicating a shape of the three-dimensional-shaped object 2 in which at least a part thereof has a three-dimensional mesh-like structure on the basis of outer shape information indicating an outer shape of the three-dimensional-shaped object 2 that is, for example, input by a user. Further, the generated shape information is divided into pieces for a plurality of layers in a vertical direction, and the piece thereof for each layer is transmitted to the printer apparatus 12.

The printer apparatus 12 is a 3D printer apparatus for forming the three-dimensional-shaped object 2. Specifically, the printer apparatus 12 acquires the shape information of the three-dimensional-shaped object 2 for each layer from the information processing apparatus 11 and forms the three-dimensional-shaped object 2 in each layer. That is, the whole shape of the three-dimensional-shaped object 2 is formed by laminating a shape formed in each layer. Such a method of forming the three-dimensional-shaped object 2 is referred to as "additive manufacturing".

For example, the printer apparatus 12 may be a 3D printer apparatus using a fused deposition modeling (FDM) method for forming a three-dimensional shape by ejecting and laminating fused resin. Further, the printer apparatus 12 may be a 3D printer apparatus using, for example, a stereolithography for forming a three-dimensional shape by using photocurable resin or the like or a powder method for forming a three-dimensional shape by hardening material powder spread in the form of layer by performing, for example, sintering with a laser or the like or firm fixation using a binder. Furthermore, the printer apparatus 12 may be a 3D printer apparatus using a method of extruding viscous material (silicone resin or the like) from a syringe or the like by using pressure.

Further, the printer apparatus 12 may include a plurality of kinds of printer heads. In this case, the three-dimensional shape forming system 1 can change material to be laminated for each printer head and can therefore form a complicated three-dimensional-shaped object 2 in which various kinds of material are combined.

The rail 13 is a stage or bridge that holds the printer apparatus 12. The rail 13 can move the printer apparatus 12 in a first direction in which the rail 13 is extended, and, in addition, a main body of the rail 13 is movable in a second direction orthogonal to the first direction. With this, the printer apparatus 12 can move to an arbitrary position on a two-dimensional plane in parallel to a horizontal plane.

The three-dimensional-shaped object 2 is a molded product in which plants can be cultivated and is used as a substitute for soil. In order to use the three-dimensional-shaped object 2 as a substitute for soil, it is desirable that the three-dimensional-shaped object 2 (also referred to as "culture medium" in hydroponics) can retain plants and water and air needed to grow the plants, be not extremely acidic or basic and have a stable pH (approximately pH4 to 8), and do not emit chemical substances or the like which have a bad influence on growth of the plants.

In order to satisfy the above-mentioned conditions, the three-dimensional-shaped object 2 is such that a region used to cultivate plants is formed to have a three-dimensional mesh-like structure. Because the three-dimensional mesh-like structure allows a plant to take root and has a large number of holes capable of retaining water and air, the three-dimensional mesh-like structure satisfies the above-mentioned conditions and is a structure suitable to cultivate plants. Note that, in order not to have a bad influence on growth of plants, the three-dimensional-shaped object 2 is preferably made of plastic resin, silicone resin, ceramics, metal, or the like which is chemically stable and whose pH is stable in a neutral region.

The three-dimensional shape forming system 1 according to the present embodiment generates shape information indicating a shape of the three-dimensional-shaped object 2 in which a region where plants are cultivated has a three-dimensional mesh-like structure on the basis of outer shape information indicating an outer shape of the three-dimensional-shaped object 2 and forms the three-dimensional-shaped object 2 on the basis of the shape information. With this, the three-dimensional shape forming system 1 can form the three-dimensional-shaped object 2 that has an arbitrary outer shape and is suitable to cultivate plants.

Note that, although FIG. 1 exemplifies the three-dimensional shape forming system 1 in which the information processing apparatus 11 and the printer apparatus 12 are separated, a technology according to the present disclosure is not limited to this exemplification. The technology according to the present disclosure may be realized as, for example, a three-dimensional shape forming apparatus in which the information processing apparatus 11 and the printer apparatus 12 are integrally provided.

[1.2. Configuration Example of Three-Dimensional Shape Forming System]

Figure 2:
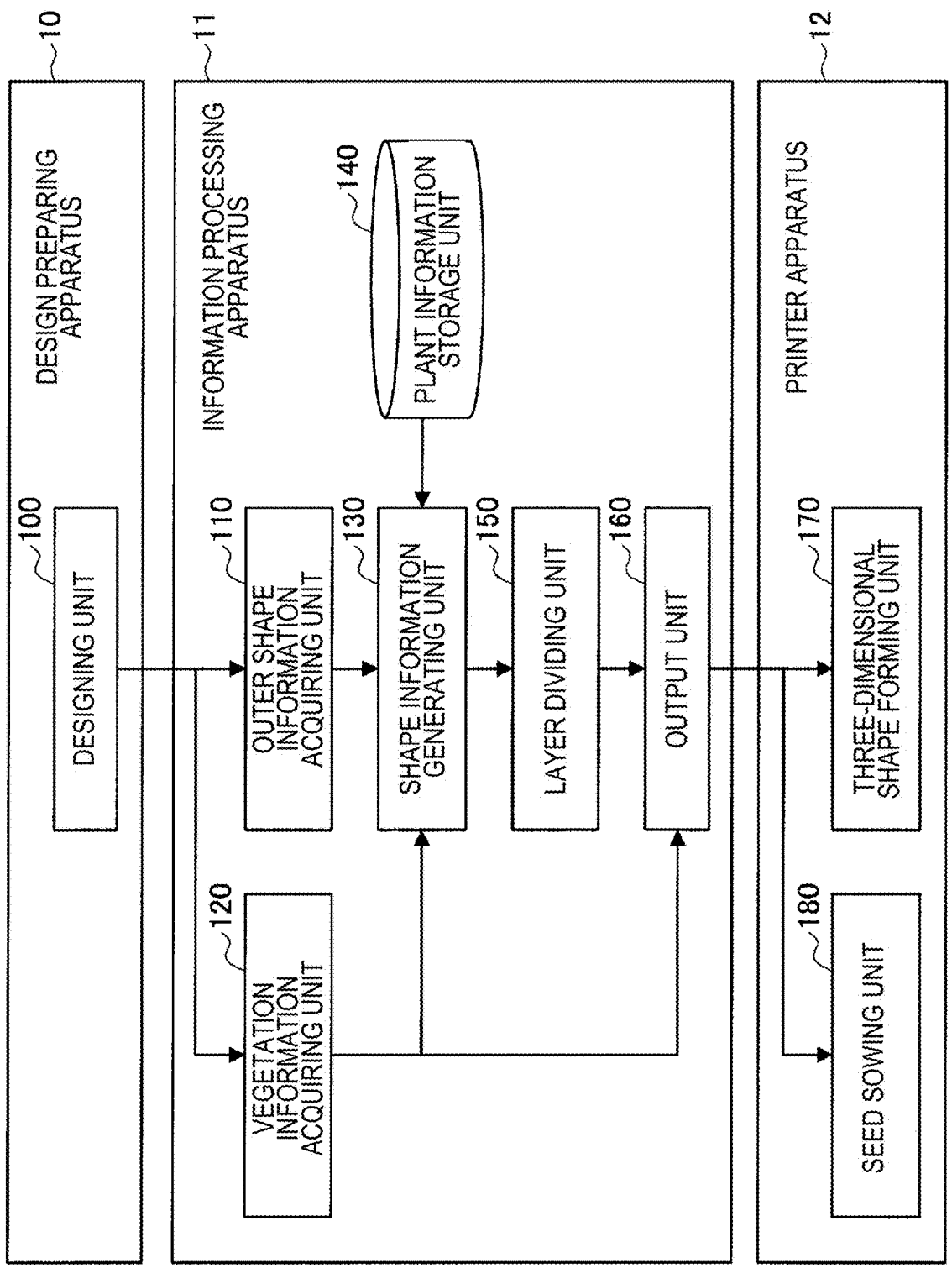
FIG. 2 is a block diagram showing an internal configuration of the three-dimensional shape forming system according to this embodiment.

Next, a configuration example of the three-dimensional shape forming system 1 according to the present embodiment will be described with reference to FIG. 2. FIG. 2 is a block diagram showing an internal configuration of the three-dimensional shape forming system 1 according to the present embodiment.

As shown in FIG. 2, the three-dimensional shape forming system 1 includes a design preparing apparatus 10, the information processing apparatus 11, and the printer apparatus 12. Further, the design preparing apparatus 10 includes a designing unit 100, and the information processing apparatus 11 includes an outer shape information acquiring unit 110, a vegetation information acquiring unit 120, a shape information generating unit 130, a plant information storage unit 140, a layer dividing unit 150, and an output unit 160. Further, the printer apparatus 12 includes a three-dimensional shape forming unit 170 and a seed sowing unit 180.

(Configuration of Design Preparing Apparatus)

The designing unit 100 generates outer shape information indicating an outer shape of the three-dimensional-shaped object 2 and vegetation information regarding arrangement of plants to be cultivated in the three-dimensional-shaped object 2 on the basis of input by the user. Specifically, the designing unit 100 generates outer shape information indicating an outer shape of the three-dimensional-shaped object 2 and vegetation information regarding arrangement of plants to be cultivated in the three-dimensional-shaped object 2 on the basis of input by the user via an input unit (not shown) provided in the design preparing apparatus 10. For example, various devices, such as a mouse, a keyboard, a touchscreen, and a sensor for sensing input operation of the user, can be used as the input unit (not shown). Further, a form of the three-dimensional-shaped object 2 indicated by the outer shape information and the vegetation information generated by the designing unit 100 is displayed on a display unit (not shown) provided in the design preparing apparatus 10. For example, a liquid crystal display device, an organic EL (electroluminescence) display device, or the like can be used as the display unit (not shown). With this, the user can design an outer shape of the three-dimensional-shaped object 2 and arrangement of plants while checking a form of the three-dimensional-shaped object 2 to be formed.

Herein, an input screen for designing the three-dimensional-shaped object 2, which is displayed on the display unit of the design preparing apparatus 10, will be described with reference to FIGS. 3 to 6. The user can freely design the three-dimensional-shaped object 2 by inputting a shape and arrangement of plants with the use of the input unit provided in the design preparing apparatus 10.

Figure 3:
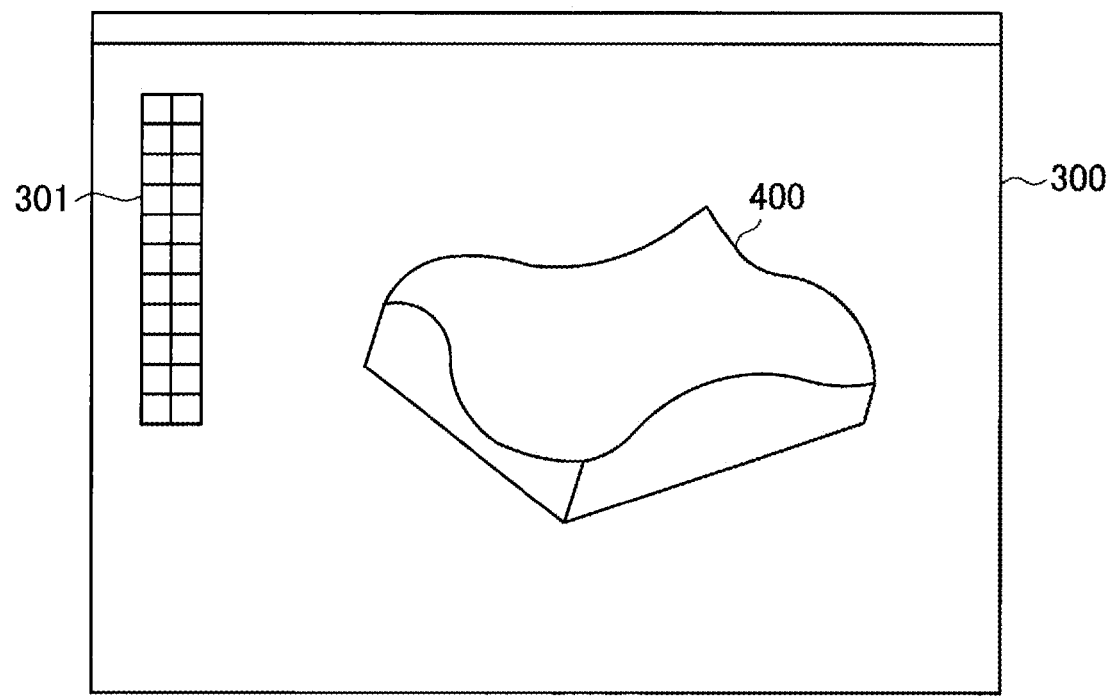
FIG. 3 is an explanatory view showing an example of an input screen for designing a three-dimensional-shaped object used to cultivate plants.
Figure 4:
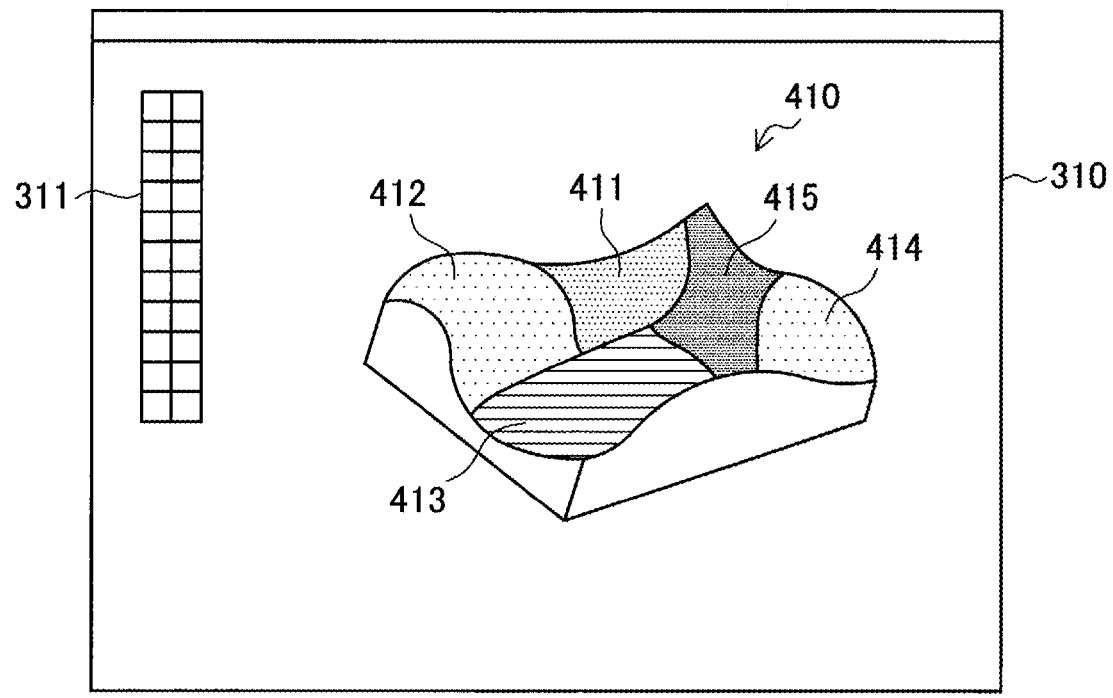
FIG. 4 is an explanatory view showing an example of an input screen for designing arrangement of plants to be cultivated in a three-dimensional-shaped object.

FIG. 3 is an explanatory view showing an example of an input screen for designing the three-dimensional-shaped object 2 used to cultivate plants, and FIG. 4 is an explanatory view showing an example of an input screen for designing arrangement of plants to be cultivated in the three-dimensional-shaped object 2.

An input screen 300 shown in FIG. 3 is a screen for designing the three-dimensional-shaped object 2. For example, an object 400 showing an outer shape of the three-dimensional-shaped object 2 is input to the input screen 300.

Note that an icon group 301 for selecting various tools that assist input of the object 400 may be provided in the input screen 300. The various tools that assist input of the object 400 may include, for example, a tool for generating an object having a basic three-dimensional shape such as a quadrangular prism and a column and a tool for changing a shape of a part of an input object, stretching the part thereof, or increasing and reducing a size of the part thereof. The various tools may also include an extruding tool for giving a volume to an arbitrary two-dimensional shape by drawing the two-dimensional shape and extruding the drawn two-dimensional shape. Note that the various tools that assist input of the object 400 are not limited to the above tools, and any tool can be used as long as the tool is a tool used in a publicly-known 3D modeling software or the like. With such an input screen 300, the user can intuitively design and input an outer shape of the three-dimensional-shaped object 2.

Further, an input screen 310 shown in FIG. 4 is a screen for designing arrangement of plants to be cultivated in the three-dimensional-shaped object 2. For example, an object 410 in which arrangement of plants to be cultivated in the three-dimensional-shaped object 2 is set is input to the input screen 310.

For example, in FIG. 4, regions 411 to 415 of the object 410 are painted in different colors, and different kinds of plants are set to be cultivated. Specifically, the user sets desired regions 411 to 415 on the object 410 and inputs a plant that the user desires to plant in each of the regions, thereby setting arrangement of plants to be cultivated in the three-dimensional-shaped object 2. Herein, the plants to be arranged may be listed in, for example, an icon group 311 displayed on the input screen 310. By selecting a plant to be cultivated in each region from the icon group 311 and designating each of the regions 411 to 415 of the object 410, the user can set arrangement of the selected plant. With such an input screen 310, the user can intuitively design which plant to cultivate in the three-dimensional-shaped object 2.

Figure 5:
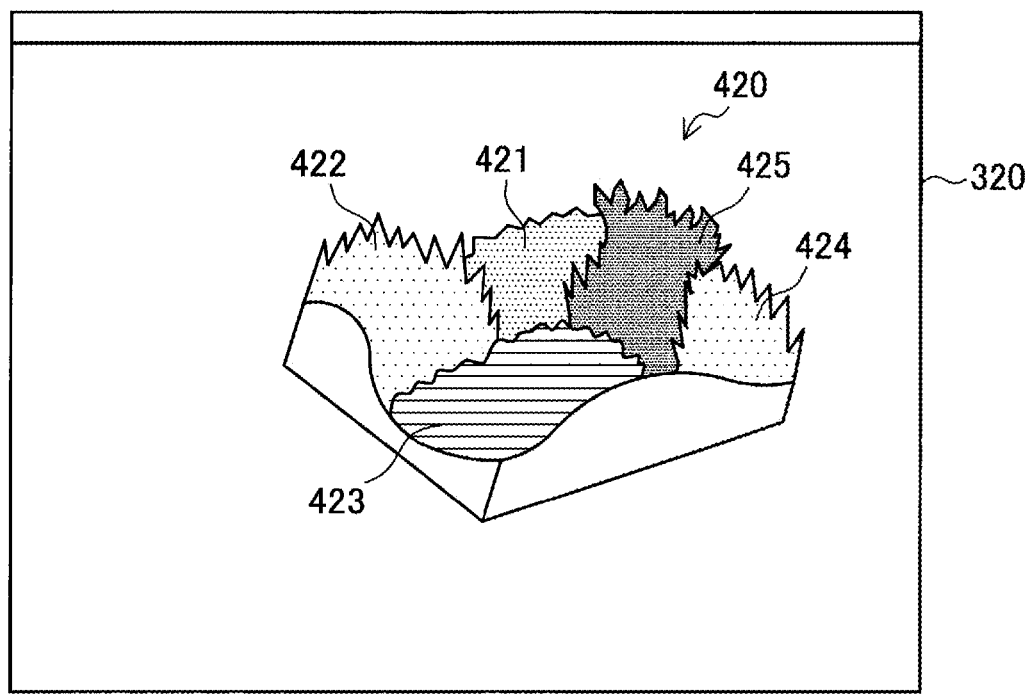
FIG. 5 is an explanatory view showing an example of a screen showing a state after plants to be cultivated in a three-dimensional-shaped object are grown.

Herein, the designing unit 100 may have a function of predicting a state after plants cultivated in the three-dimensional-shaped object 2 are grown and a function of presenting optimal arrangement of seeds of plants in the three-dimensional-shaped object 2. FIG. 5 is an explanatory view showing an example of a screen showing a state after plants to be cultivated in the three-dimensional-shaped object 2 are grown, and FIG. 6 is an explanatory view showing an example of a screen showing arrangement of seeds of plants to be cultivated in the three-dimensional-shaped object 2.

A prediction screen 320 shown FIG. 5 is a screen on which a state after plants to be cultivated in the three-dimensional-shaped object 2 are grown is predicted. Specifically, the prediction screen 320 displays an object 420 on which an image obtained by predicting a state after the plants input on the input screen 310 are grown is superimposed. For example, in FIG. 5, predicted images 421 to 425 obtained by predicting a state after the plants set in the respective regions 411 to 415 of the object 410 are grown are superimposed on the object 420 and are displayed. With such a prediction screen 320, even a user who does not have knowledge or experience of gardening can check a state after plants to be cultivated in the three-dimensional-shaped object 2 are grown and select plants to be cultivated in the three-dimensional-shaped object 2.

As a method of predicting a state after plants are grown, a publicly-known simulation method regarding growth of plants can be used. Further, a general growth image of each plant may be stored in each growing period and a growth image of a plant corresponding to a predicted growing period may be displayed as a predicted image. Note that a growing period of a plant may be arbitrarily designated by the user, such as one month, three months, or one year.

Figure 6:
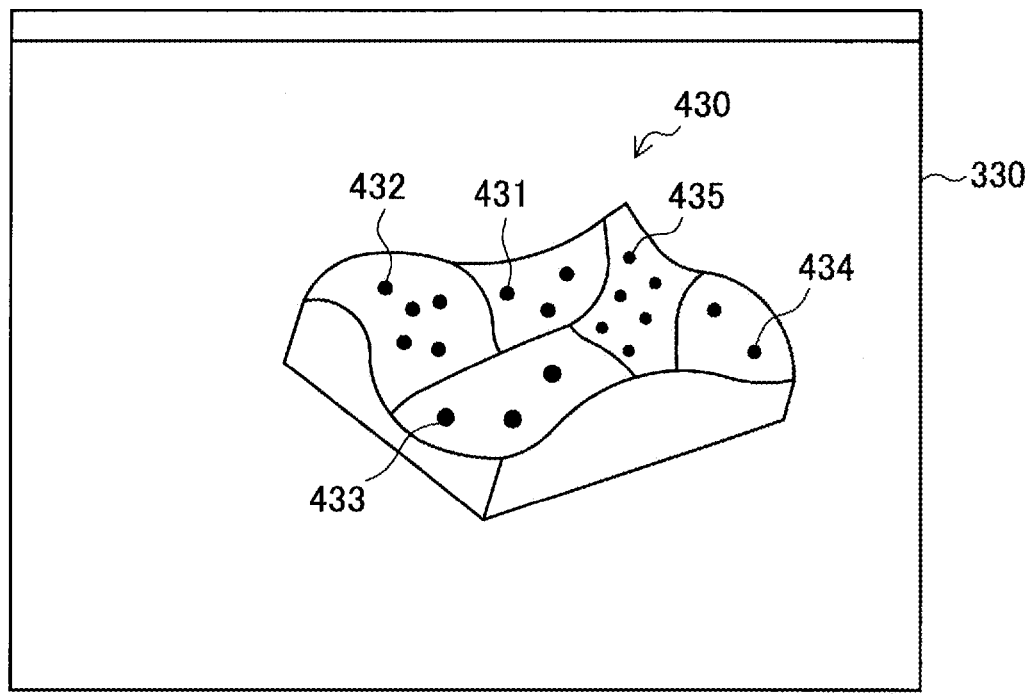
FIG. 6 is an explanatory view showing an example of a screen showing arrangement of seeds of plants cultivated in a three-dimensional-shaped object.

Further, a sowing screen 330 shown in FIG. 6 is a screen for presenting optimal sowing positions of seeds of plants to be cultivated in the three-dimensional-shaped object 2. Specifically, based on the arrangement of the plants input on the input screen 310, an object 430 in which optimal sowing positions of seeds of the respective plants are presented is displayed on the sowing screen 330. For example, in FIG. 6, the optimal sowing positions of the seeds of the plants set in the respective regions 411 to 415 of the object 410 are superimposed on the object 430 and are displayed. With such a sowing screen 330, even a user who does not have knowledge or experience of gardening can sow seeds of plants in the three-dimensional-shaped object 2 at appropriate intervals and density and can form the three-dimensional-shaped object 2 in which the cultivated plants are appropriately grown. Note that sowing positions of seeds of plants can be set in consideration of, for example, a germination rate of the seeds of each plant and optimal denseness for growth of each plant.

(Configuration of Information Processing Apparatus)

The outer shape information acquiring unit 110 acquires the outer shape information indicating the outer shape of the three-dimensional-shaped object 2. Specifically, the outer shape information acquiring unit 110 is an input interface and accepts input of the outer shape information indicating the outer shape of the three-dimensional-shaped object 2 output from the designing unit 100 of the design preparing apparatus 10. For example, the outer shape information acquiring unit 110 may be a circuit for reading outer shape information from a memory or storage medium storing the outer shape information or may be a wired or wireless external interface such as a universal serial bus (USB) interface, an Ethernet (registered trademark) interface, or an IEEE 802.11 standard interface to which outer shape information is input from the outside. The outer shape information is, for example, information indicating an outer shape of an arbitrary three-dimensional-shaped object input by the user. Such outer shape information is preferably generated by the above-mentioned designing unit 100 with reference to FIGS. 3 to 6 but may be generated by publicly-known three-dimensional modeling software.

The vegetation information acquiring unit 120 acquires the vegetation information regarding plants to be cultivated in the three-dimensional-shaped object 2. Specifically, the vegetation information acquiring unit 120 is an input interface and accepts input of the vegetation information regarding plants to be cultivated in the three-dimensional-shaped object 2 output from the designing unit 100 of the design preparing apparatus 10. For example, the vegetation information acquiring unit 120, as well as the outer shape information acquiring unit 110, may be a circuit for reading vegetation information from a memory or storage medium or may be a wired or wireless external interface such as a USB interface, an Ethernet (registered trademark) interface, or an IEEE 802.11 standard interface to which vegetation information is input from the outside. The vegetation information includes, for example, information regarding the kind of plants to be cultivated in the three-dimensional-shaped object 2, a region where the plants are cultivated, and arrangement thereof. Further, the vegetation information may include information regarding positions at which seeds of the plants to be cultivated in the three-dimensional-shaped object 2 are sown. Such vegetation information is preferably generated by the above-mentioned designing unit 100 with reference to FIG. 3 to FIG. 6.

Based on the outer shape information indicating the outer shape of the three-dimensional-shaped object 2, the shape information generating unit 130 generates shape information indicating a shape of the three-dimensional-shaped object 2 in which at least a part of a region has a three-dimensional mesh-like structure. Specifically, the shape information generating unit 130 generates shape information indicating a shape of the three-dimensional-shaped object 2 that has an outer shape indicated by the outer shape information acquired by the outer shape information acquiring unit 110 and in which a region where plants are cultivated has a three-dimensional mesh-like structure. That is, the shape information generating unit 130 generates shape information indicating a shape of the three-dimensional-shaped object 2 by converting a region in the three-dimensional-shaped object 2, the region being a region where plants are cultivated, into a three-dimensional mesh-like structure that satisfies the conditions suitable for a growth environment of plants.

Herein, mesh of the three-dimensional mesh-like structure may have any shape and may have any one of, for example, a triangular shape, a rectangular shape, a hexagonal shape, and a circular shape. Further, the mesh of the three-dimensional mesh-like structure may have a plurality of shapes in combination or may have random shapes.

Further, a size of the mesh of the three-dimensional mesh-like structure is preferably set on the basis of the kind of plant to be cultivated in a region of the three-dimensional mesh-like structure. In a case where the mesh of the three-dimensional mesh-like structure is extremely smaller than a root of a plant to be cultivated, there is a possibility that the plant to be cultivated cannot satisfactorily take root in the three-dimensional mesh-like structure. Further, in a case where the mesh of the three-dimensional mesh-like structure is extremely larger than a root of a plant to be cultivated, there is a possibility that the plant to be cultivated cannot satisfactorily absorb moisture and nourishment from the root in the three-dimensional mesh-like structure. Furthermore, in a case where the mesh of the three-dimensional mesh-like structure is extremely larger than a seed of a plant to be cultivated, there is a possibility that the seed of the plant is not held in three-dimensional mesh-like structure. Therefore, the size of the mesh of the three-dimensional mesh-like structure is preferably set on the basis of a size of at least one of a root and a seed of a plant to be cultivated in the region of the three-dimensional mesh-like structure.

Specifically, the size of the mesh of the three-dimensional mesh-like structure is preferably from 0.1 mm to several mm. For example, in a case where a plant to be cultivated is herbs, the size of the mesh of the three-dimensional mesh-like structure is preferably from 0.2 mm to 1 mm, and, in a case where a plant to be cultivated is tomato or the like, the size of the mesh of the three-dimensional mesh-like structure is preferably from 2 mm to 3 mm. Further, in a case where a plant to be cultivated is watermelon or the like, the size of the mesh of the three-dimensional mesh-like structure is preferably from 4 mm to 6 mm.

Further, the shape information generating unit 130 may form a pit (i.e., hollow or depression) at a position at which a seed of a plant is sown in the three-dimensional mesh-like structure of the three-dimensional-shaped object 2. For example, in a case where a seed of a plant is sown in an inclined part of the three-dimensional-shaped object 2, there is a possibility that the seed of the plant rolls and moves from a position at which the seed has been sown. Therefore, the shape information generating unit 130 preferably forms a pit having a size at which a seed to be sown can be received at a position at which the seed is sown in the three-dimensional mesh-like structure.

Note that information regarding the kind of plant to be cultivated in the three-dimensional-shaped object 2 and information regarding a position at which a seed of a plant is sown may be acquired by, for example, the vegetation information acquiring unit 120 as vegetation information. Further, information regarding sizes of a seed and a root of a plant may be acquired from, for example, the plant information storage unit 140.

The plant information storage unit 140 stores information regarding plants. Specifically, the plant information storage unit 140 may store information regarding sizes of a seed and a root of a plant and may store information for predicting a growth state of a plant and information regarding appropriate denseness of a plant for setting optimal sowing positions of seeds of the plant.

Note that the plant information storage unit 140 may be provided inside the information processing apparatus 11 or may be provided outside the information processing apparatus 11. In a case where the plant information storage unit 140 is provided outside the information processing apparatus 11, the information processing apparatus 11 may acquire information regarding plants from the plant information storage unit 140 via a network or the like.

The layer dividing unit 150 divides the shape of the three-dimensional-shaped object 2 into a plurality of layers laminated in the vertical direction and generates shape information of each layer. Specifically, the layer dividing unit 150 divides the shape of the three-dimensional-shaped object 2 indicated by the shape information generated by the shape information generating unit 130 into a plurality of layers laminated in the vertical direction and generates shape information indicating a shape of each of the divided layers.

The output unit 160 outputs the shape information indicating the shape of each layer of the three-dimensional-shaped object 2. Specifically, the output unit 160 is an output interface and outputs the shape information indicating the shape of each of the plurality of layers divided by the layer dividing unit 150 to the three-dimensional shape forming unit 170. Further, the output unit 160 may output the vegetation information of the three-dimensional-shaped object 2 acquired by the vegetation information acquiring unit 120 to the seed sowing unit 180. For example, the output unit 160 may be a circuit for outputting information from a memory or storage medium or may be a wired or wireless external interface such as USB interface, an Ethernet (registered trademark) interface, or an IEEE 802.11 standard interface for outputting information to the outside.

In the three-dimensional shape forming system 1, the three-dimensional shape forming unit 170 forms the three-dimensional-shaped object 2 as a laminated body of a plurality of layers laminated in the vertical direction by using additive manufacturing. Therefore, the layer dividing unit 150 converts the shape information generated by the shape information generating unit 130 into pieces of shape information of the respective divided layers, thereby allowing the three-dimensional shape forming unit 170 to form the three-dimensional-shaped object 2. Software having such a function of the layer dividing unit 150 is generally referred to as "slicing software" in some cases.

Note that the layer dividing unit 150 may be provided in the printer apparatus 12 instead of the information processing apparatus 11. In such a case, the output unit 160 may output, to the layer dividing unit 150, the outer shape information indicating the outer shape of the three-dimensional-shaped object 2 generated by the shape information generating unit 130.

(Configuration of Printer Apparatus)

The three-dimensional shape forming unit 170 forms the three-dimensional-shaped object 2 by using additive manufacturing. Specifically, the three-dimensional shape forming unit 170 accepts input of the shape information of the three-dimensional-shaped object 2 in each layer divided by the layer dividing unit 150 from the output unit 160 and forms the three-dimensional-shaped object 2 in each layer on the basis of the shape information. For example, the three-dimensional shape forming unit 170 may be a 3D printer head that is provided in the printer apparatus 12 and forms the three-dimensional-shaped object 2.

Herein, a method in which the three-dimensional shape forming unit 170 forms the three-dimensional-shaped object 2 is not particularly limited as long as the method is a kind of additive manufacturing. For example, the three-dimensional shape forming unit 170 may form the three-dimensional-shaped object 2 by using, for example, a fused deposition modeling (FDM) method for forming a three-dimensional shape by ejecting and laminating fused resin, a stereolithography for forming a three-dimensional shape by using photocurable resin, a powder method for forming a three-dimensional shape by hardening material powder spread in the form of layer by performing, for example, sintering with a laser or the like or firm fixation using a binder, or a method for forming a three-dimensional shape by extruding viscous material from a syringe.

Further, as material from which the three-dimensional-shaped object 2 is made, any material can be used as long as the material is material from which the three-dimensional shape forming unit 170 can form the three-dimensional-shaped object 2 by using additive manufacturing. Specifically, the three-dimensional-shaped object 2 may be formed by using plastic resin, silicone resin, ceramic, metal, and the like. Ceramic is preferably sintered. Note that the three-dimensional-shaped object 2 is used to cultivate plants, and therefore, in order to improve a water retention capacity, material such as ceramic having a porous surface may be used as material from which the three-dimensional-shaped object 2 is made.

For example, in a case where the three-dimensional-shaped object 2 is formed by using the fused deposition modeling method, thermoplastic resin such as acrylonitrile-butadiene-styrene resin (ABS resin), polylactic resin (PLA resin), and polycarbonate resin can be suitably used as material. Further, those thermoplastic resins may be mixed with impurities such as chips of wood. Further, in a case where the three-dimensional-shaped object 2 is formed by using the stereolithography, ultraviolet curable resin such as acrylic resin and epoxy resin can be suitably used as material. Further, in a case where the three-dimensional-shaped object 2 is formed by using the powder method, organic resin such as nylon and metal such as bronze, steel, nickel, and titanium can be suitably used as material. Furthermore, in a case where the three-dimensional-shaped object 2 is formed by extruding viscous material from a syringe, silicone resin and the like can be suitably used as material.

The seed sowing unit 180 sows seeds of plants in the formed three-dimensional-shaped object 2. Specifically, the seed sowing unit 180 accepts input of the vegetation information of the three-dimensional-shaped object 2 from the output unit 160 and, on the basis of sowing positions of seeds included in the vegetation information, sows the seeds of plants at the respective sowing positions. For example, the seed sowing unit 180 may be a 3D printer head that is provided in the printer apparatus 12 and sows seeds of plants in the three-dimensional-shaped object 2.

Herein, the seed sowing unit 180 may be configured as any mechanism as long as the seed sowing unit 180 can store a plurality of kinds of seeds and selectively sow the seeds. For example, the seed sowing unit 180 may sow seeds in the three-dimensional-shaped object 2 by including a plurality of seed storage chambers and having a mechanism for selectively dropping seeds of a particular kind of plant on the three-dimensional-shaped object 2 from the seed storage chambers.

Further, the seed sowing unit 180 may sow seeds of a plant in the form of a mixture with gelled material capable of retaining moisture. Specifically, the seed sowing unit 180 may be a syringe filled with a mixture of gelled material and seeds of a plant and sow the seeds of the plant in the three-dimensional-shaped object 2 by injecting the mixture into the three-dimensional-shaped object 2. With this, it is possible to orient moisture around the seeds by using the gelled material and regularly supply moisture to the seeds, and therefore it is possible to improve a germination rate of the sown seeds. Note that, as the gelled material capable of retaining moisture, for example, sodium alginate that is mainly contained in seaweed and the like and a water-absorbing polymer can be exemplified.

A mixing ratio of gelled material to seeds of a plant to be sown can be set on the basis of the kind of seeds, a structure of the three-dimensional-shaped object 2, and the kind of forming material. In such a case, the information processing apparatus 11 further includes a mixing-ratio calculation unit, and the mixing-ratio calculation unit may automatically calculate a mixing ratio of gelled material to seeds of a plant to be sown on the basis of information regarding the three-dimensional-shaped object 2 to be formed and information regarding the plant to be sown in the three-dimensional-shaped object 2.

For example, in a case where the seeds to be sown are basil or the like which takes time to germinate or in a case where a water retention capacity of the three-dimensional-shaped object 2 is low, the mixing-ratio calculation unit may calculate the mixing ratio so that a proportion of the gelled material to be mixed with the seeds is increased. With this, it is possible to reduce a possibility that supply of moisture from the gelled material is stopped and the seeds dry before the sown seeds germinate. Further, in a case where the seeds to be sown are arugula or the like which soon germinates or in a case where the water retention capacity of the three-dimensional-shaped object 2 is high, the mixing-ratio calculation unit may calculate the mixing ratio so that a proportion of the gelled material to be mixed with the seeds is reduced. With this, it is possible to reduce a possibility that the germinated seeds are undeveloped because the germinated seeds move in the gelled material and a possibility that the seeds move from sowing positions thereof.

For example, in a case where a position at which a seed is sown in the three-dimensional-shaped object 2 is inclined, the gelled material tends to flow along inclination. Therefore, the mixing-ratio calculation unit may calculate the mixing ratio so that a proportion of the gelled material to be mixed with the seed is increased in consideration of a flowing amount of the gelled material. Further, in a case where a position at which a seed is sown in the three-dimensional-shaped object 2 is flat, the gelled material does not flow, and therefore the mixing-ratio calculation unit may calculate the mixing ratio so that a proportion of the gelled material to be mixed with the seed is reduced.

In a case where a mixing ratio of gelled material to seeds of a plant to be sown is controlled, the seed sowing unit 180 may include a plurality of syringes filled with respective seeds different from each other and a syringe filled with gelled material. In such a case, by controlling injection amounts of the respective syringes filled with the seeds and the syringe filled with the gelled material, the seed sowing unit 180 can change the mixing ratio in a mixture of the gelled material and the seeds for each kind of seed and in each region of the three-dimensional-shaped object 2.

Further, in a case where the mixing-ratio calculation unit of the information processing apparatus 11 automatically calculates a mixing ratio of gelled material to seeds of a plant to be sown, the information processing apparatus 11 outputs vegetation information including mixing ratio information regarding the mixing ratio of the seeds to the gelled material from the output unit 160. By controlling the syringe filled with the seeds and the syringe filled with the gelled material on the basis of the mixing ratio information included in the output vegetation information, the seed sowing unit 180 can sow the seeds in accordance with the mixing ratio calculated in the information processing apparatus 11.

With the above configuration, the three-dimensional shape forming system 1 according to the present embodiment can form the three-dimensional-shaped object 2 that has an arbitrary outer shape that is, for example, input by the user and is used to cultivate plants. Further, the three-dimensional shape forming system 1 can sow seeds of plants in the formed three-dimensional-shaped object 2 and cultivate the plants on the three-dimensional-shaped object 2.

Figure 7:
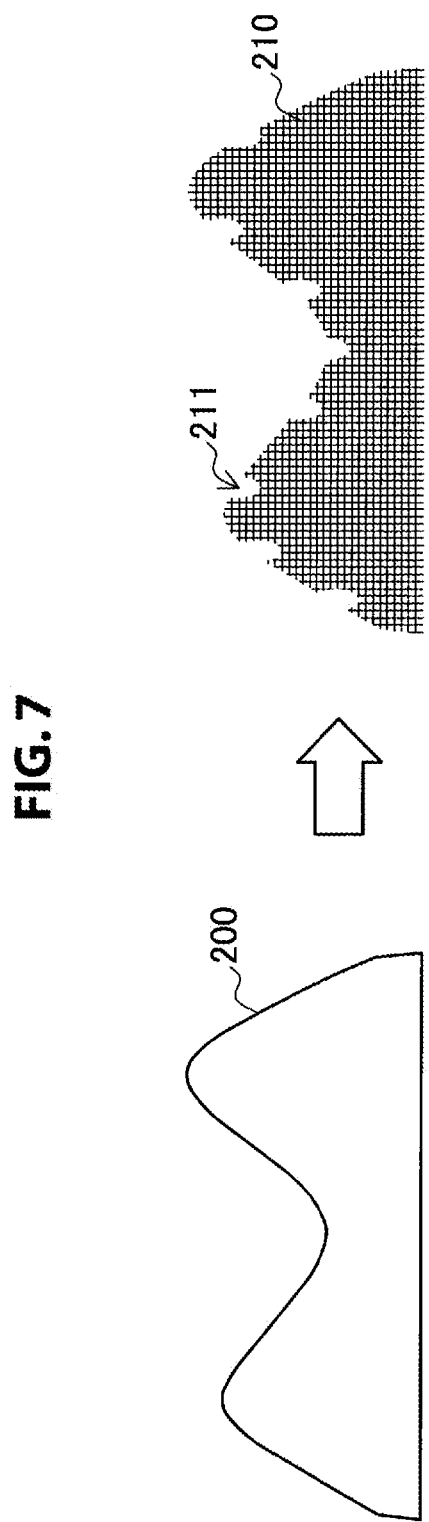
FIG. 7 is an explanatory view for describing a three-dimensional-shaped object generated on the basis of outer shape information.

A three-dimensional-shaped object formed by such a three-dimensional shape forming system 1 according to the present embodiment will be specifically described with reference to FIG. 7. FIG. 7 is an explanatory view for describing a three-dimensional-shaped object generated on the basis of outer shape information.

As shown in FIG. 7, for example, in a case where an outer shape 200 of a three-dimensional-shaped object in which plants are cultivated is input by the user, the three-dimensional shape forming system 1 forms a three-dimensional-shaped object 210 that corresponds to the input outer shape 200 and has a three-dimensional mesh-like structure inside. That is, the three-dimensional-shaped object 210 to be formed has the same outer edge shape as a shape shown by the input outer shape 200 and is formed as a structure body having a three-dimensional mesh-like structure. The three-dimensional mesh-like structure can retain plants themselves, moisture, and air, and therefore the three-dimensional-shaped object 210 satisfies the conditions suitable for a growth environment of plants and can therefore be suitably used as a substitute for soil (culture medium in hydroponics) in which plants are cultivated.

Further, a plurality of pits 211 for receiving seeds at positions at which the seeds of a plant are sown may be provided in the three-dimensional-shaped object 210. With this configuration, the three-dimensional-shaped object 210 can prevent the seeds from rolling and moving along inclination from the positions at which the seeds have been sown.

Further, a three-dimensional-shaped object formed by the three-dimensional shape forming system 1 according to the present embodiment may form a landscape of, for example, a garden in which plants are cultivated in a part of a region and landscape components such as a pond and a rock are arranged in a part of the region. The three-dimensional-shaped object 2 in which such landscape components are arranged can also be designed by the designing unit 100.

Figure 8:
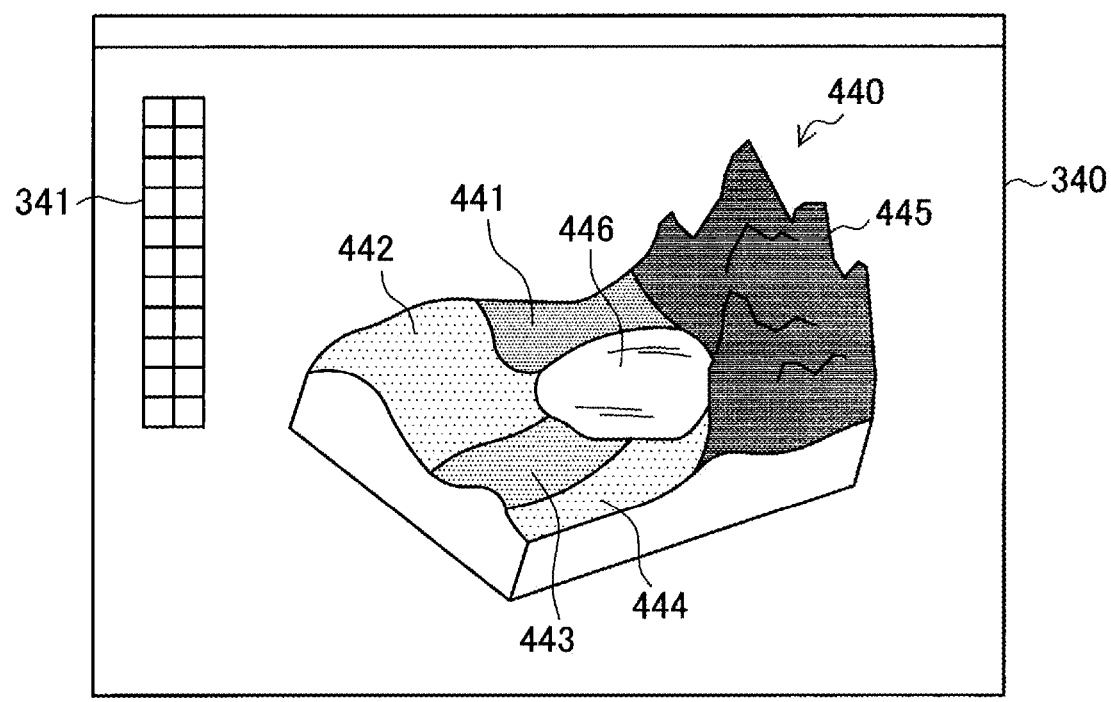
FIG. 8 is an explanatory view showing an example of an input screen on which a three-dimensional-shaped object in which plants and landscape components are arranged is designed.

Such a three-dimensional-shaped object will be specifically described with reference to FIGS. 8 and 9. FIG. 8 is an explanatory view showing an example of an input screen for designing a three-dimensional-shaped object in which plants and landscape components are arranged, the input screen being displayed on the display unit of the design preparing apparatus 10. Further, FIG. 9 is an explanatory view for describing a specific structure in which plants and landscape components are arranged.

Note that the landscape components are inorganic substances other than plants, water sources, artificial objects, and the like forming a landscape in a garden or the like. For example, the landscape components are inorganic substances such as a stone, a rock, and a mountain, water sources such as a river and a pond, and artificial objects such as a bridge, a shed, a bench, a garden lantern, and a fence.

For example, an input screen 340 shown in FIG. 8 is a screen for designing a three-dimensional-shaped object and a landscape formed on the three-dimensional-shaped object. Specifically, an object 440 in which plants and landscape components are arranged on a three-dimensional-shaped object is input to the input screen 340.

In FIG. 8, plants to be cultivated are set in regions 441 to 444 on the object 440 by being painted in different colors. Further, arrangement of landscape components such as rocks 445 and a pond 446 is also set on the object 440. Herein, the landscape components to be arranged on the object 440 may be listed in, for example, an icon group 341 displayed on the input screen 340. By selecting a landscape component to be arranged on the object 440 from the icon group 341 and designating a position on the object 440, the user can set arrangement of the selected landscape component on the object 440. With such an input screen 340, the user can form a three-dimensional-shaped object as a garden or the like by arranging plants and landscape components on the three-dimensional-shaped object.

The three-dimensional-shaped object input on the input screen 340 shown in FIG. 8 can be realized as, for example, a structure shown in FIG. 9.

Specifically, as shown in FIG. 9, a three-dimensional-shaped object 220 has a non-cultivated region 221 and a cultivated region 222. The cultivated region 222 is a region where plants are cultivated and is formed to have a three-dimensional mesh-like structure suitable to grow plants. Further, the non-cultivated region 221 is a region where plants are not cultivated, and therefore the non-cultivated region 221 does not need to have a three-dimensional mesh-like structure and is formed to have a free structure. For example, the non-cultivated region 221 can be used as a pond by being formed to have a dense structure so as to store water or can be used to form a landscape by being formed to have a shape such as a rock or a garden lantern.

With such a configuration, the three-dimensional shape forming system 1 can form a three-dimensional-shaped object having a landscape of a garden in which plants are cultivated in a part of a region and a bridge, a garden lantern, a rocky area, and the like are assembled in a part of the region. Further, the three-dimensional shape forming system 1 can form, as a three-dimensional-shaped object, furniture that looks as if a garden is embedded in appearance by cultivating plants in a part of a region of a chair, a table, and the like. Furthermore, the three-dimensional shape forming system 1 can also form a pipeline that is a path of water inside the non-cultivated region and can therefore form a three-dimensional-shaped object in which, by injecting water into a predetermined place, the injected water automatically spreads all over the whole three-dimensional-shaped object.

[1.3. Operation Example of Three-Dimensional Shape Forming System]

Figure 10:
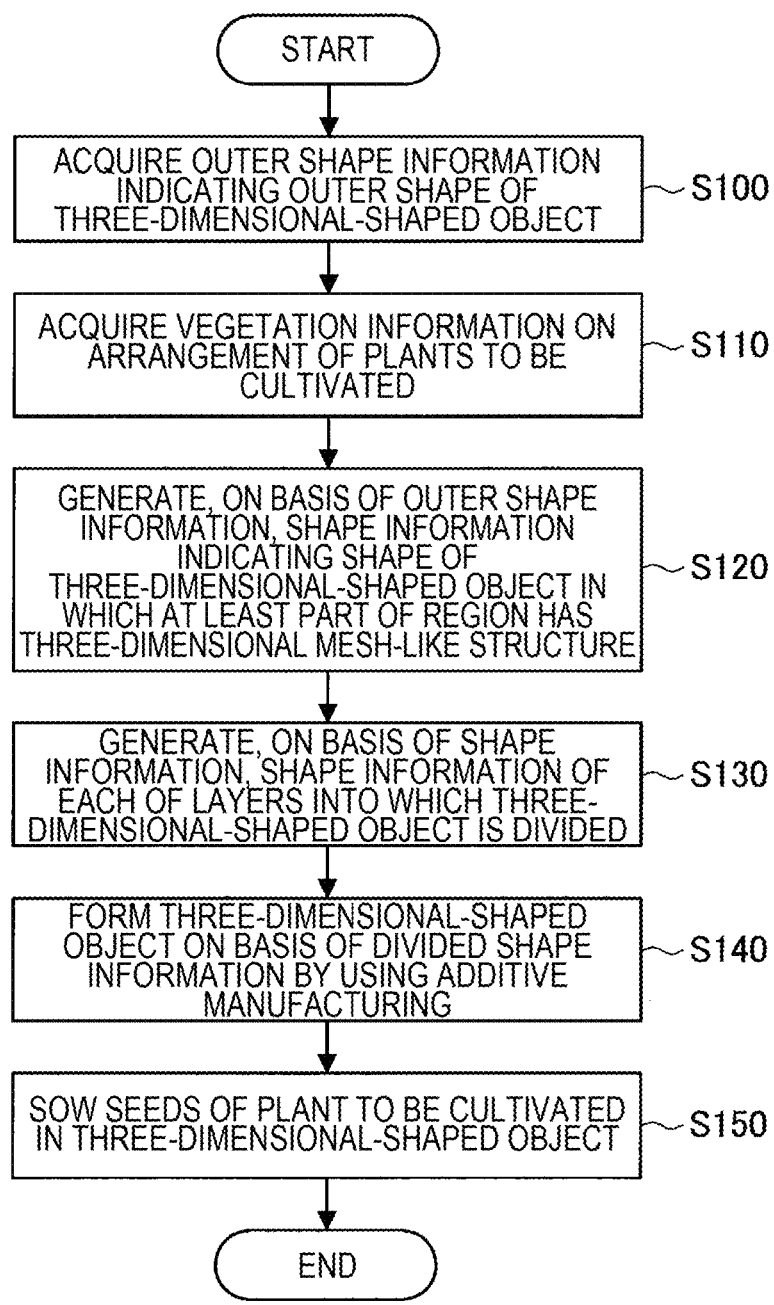
FIG. 10 is a flowchart showing a flow of operation of the three-dimensional shape forming system according to this embodiment.
Figure 11:
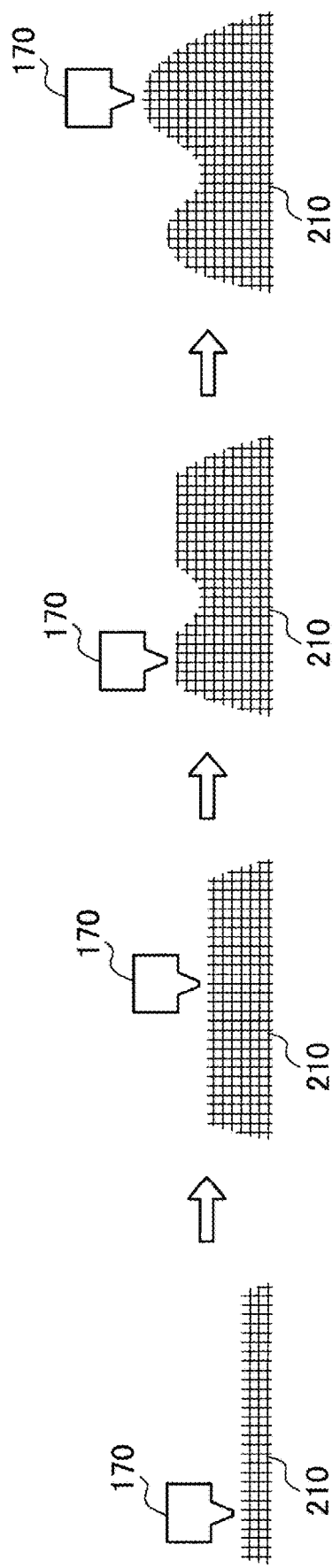
FIG. 11 is an explanatory view for describing operation of the three-dimensional shape forming system according to this embodiment.
Figure 12:
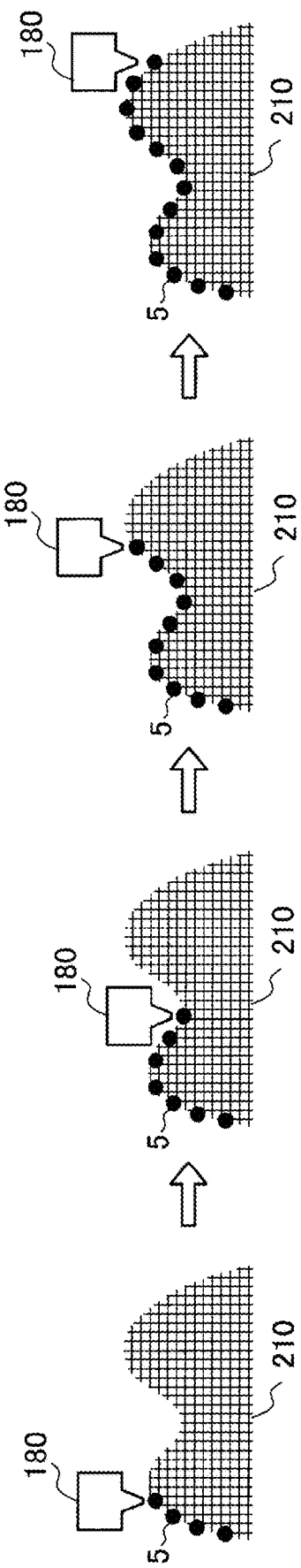
FIG. 12 is an explanatory view for describing operation of the three-dimensional shape forming system according to this embodiment.

Next, a flow of operation of the three-dimensional shape forming system 1 according to the present embodiment will be described with reference to FIGS. 10 to 12. FIG. 10 is a flowchart showing a flow of operation of the three-dimensional shape forming system 1 according to the present embodiment. Further, FIGS. 11 and 12 are explanatory views for describing operation of the three-dimensional shape forming system 1 according to the present embodiment.

As shown in FIG. 10, first, the outer shape information acquiring unit 110 acquires outer shape information indicating an outer shape of a three-dimensional-shaped object. Specifically, outer shape information designed by a user is input to the outer shape information acquiring unit 110 from the designing unit 100 (S100). Further, vegetation information regarding arrangement of plants to be cultivated in the three-dimensional-shaped object is input to the vegetation information acquiring unit 120 from the designing unit 100 as well (S110). Next, based on the outer shape information, the shape information generating unit 130 generates shape information indicating a shape of the three-dimensional-shaped object in which at least a region where plants are cultivated has a three-dimensional mesh-like structure (S120). Then, based on the generated shape information, the layer dividing unit 150 generates shape information of each of layers into which the three-dimensional-shaped object is divided (S130).

Next, the generated shape information of each layer is output to the three-dimensional shape forming unit 170 by the output unit 160, and the three-dimensional shape forming unit 170 forms the three-dimensional-shaped object on the basis of the shape information of each layer by using additive manufacturing (S140). For example, as shown in FIG. 11, the three-dimensional shape forming unit 170 may form a three-dimensional-shaped object 210 by laminating layers from the bottom. Then, the seed sowing unit 180 sows seeds of plants to be cultivated in the formed three-dimensional-shaped object (S150). For example, as shown in FIG. 12, the seed sowing unit 180 may sow seeds 5 in the three-dimensional-shaped object 210 formed by the three-dimensional shape forming unit 170 at optimal intervals and density for growth.

With such operation as described above, the three-dimensional shape forming system 1 according to the present embodiment can form a three-dimensional-shaped object that has an arbitrary outer shape and is used to cultivate plants. Further, by sowing seeds of plants in the formed three-dimensional-shaped object, the three-dimensional shape forming system 1 can cultivate the plants in the three-dimensional-shaped object.

2. Second Embodiment

[2.1. Configuration Example of Three-Dimensional Shape Forming System]

Figure 13:
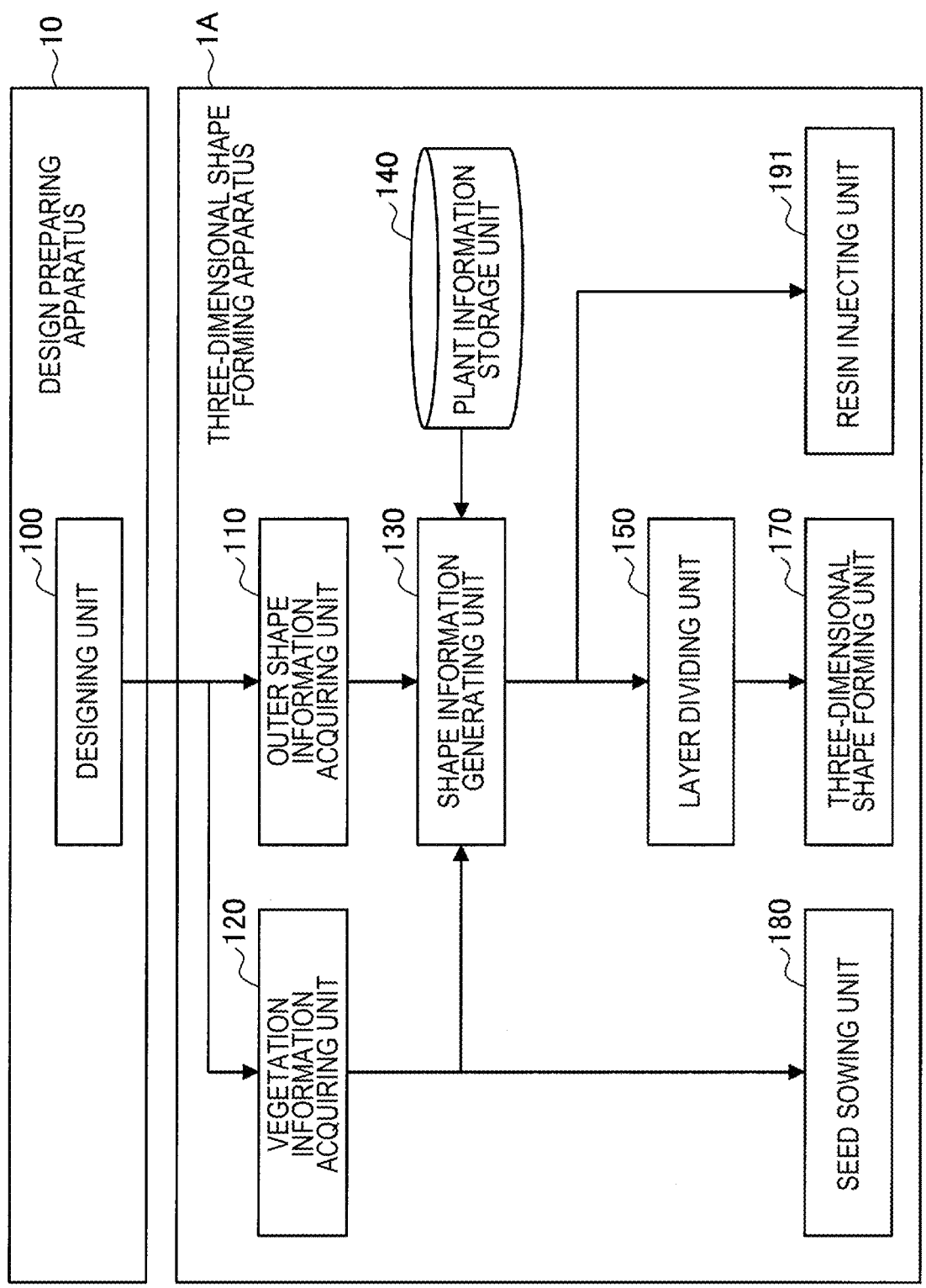
FIG. 13 is a block diagram showing an internal configuration of a three-dimensional shape forming system according to a second embodiment of the present disclosure.
Figure 14:
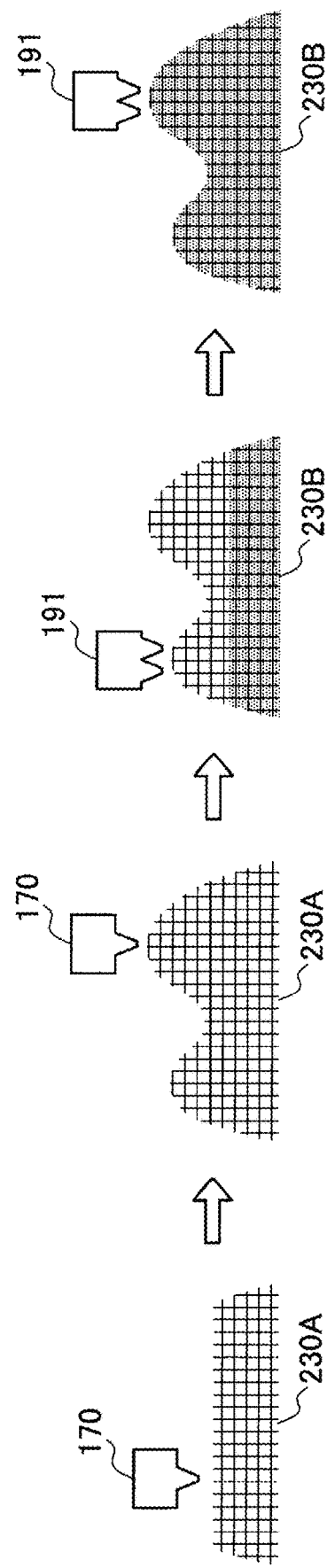
FIG. 14 is an explanatory view showing operation of the three-dimensional shape forming apparatus according to this embodiment.
Figure 15:
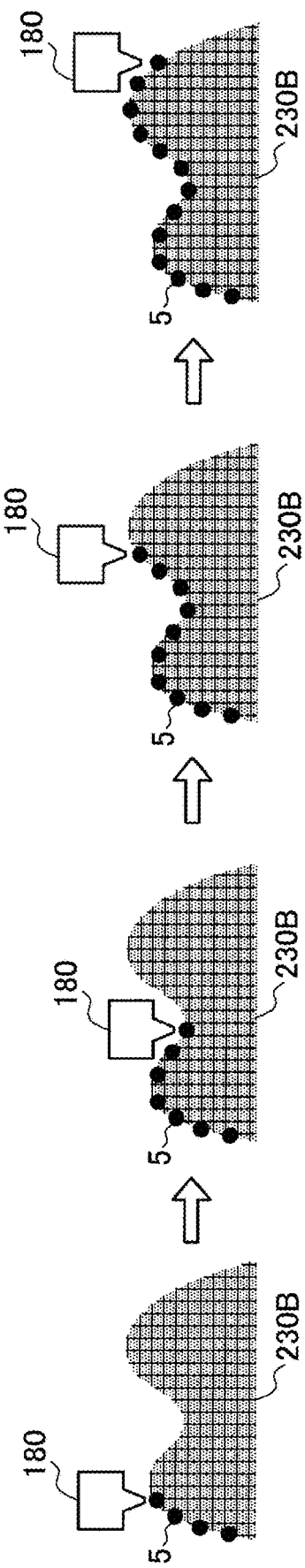
FIG. 15 is an explanatory view showing operation of the three-dimensional shape forming apparatus according to this embodiment.

Next, a three-dimensional shape forming system according to a second embodiment of the present disclosure will be described with reference to FIGS. 13 to 15. FIG. 13 is a block diagram showing an internal configuration of the three-dimensional shape forming system according to the second embodiment of the present disclosure. Further, FIGS. 14 and 15 are explanatory views showing operation of the three-dimensional shape forming apparatus according to the present embodiment.

As shown in FIG. 13, the three-dimensional shape forming system according to the present embodiment is configured to include the design preparing apparatus 10 and a three-dimensional shape forming apparatus 1A. Further, the design preparing apparatus 10 includes the designing unit 100, and the three-dimensional shape forming apparatus 1A includes the outer shape information acquiring unit 110, the vegetation information acquiring unit 120, the shape information generating unit 130, the plant information storage unit 140, the layer dividing unit 150, the three-dimensional shape forming unit 170, a resin injecting unit 191, and the seed sowing unit 180.

Note that the three-dimensional shape forming apparatus 1A may be made up of a plurality of pieces of hardware. For example, the three-dimensional shape forming apparatus 1A may be made up of an information processing apparatus including the outer shape information acquiring unit 110, the vegetation information acquiring unit 120, the shape information generating unit 130, the plant information storage unit 140, and the layer dividing unit 150 and a printer apparatus including the three-dimensional shape forming unit 170, the resin injecting unit 191, and the seed sowing unit 180.

The three-dimensional shape forming apparatus 1A according to the present embodiment is different from the three-dimensional shape forming system 1 according to the first embodiment in that the three-dimensional shape forming apparatus 1A further includes the resin injecting unit 191. Hereinafter, a characteristic configuration of the three-dimensional shape forming apparatus 1A according to the present embodiment will be described, and description of a configuration substantially similar to that of the three-dimensional shape forming system 1 according to the first embodiment will be omitted.

The resin injecting unit 191 injects unfoamed foamable resin into the three-dimensional mesh-like structure of the three-dimensional-shaped object 2. Note that the injected foamable resin foams in the three-dimensional mesh-like structure. For example, the resin injecting unit 191 may be a 3D printer head that injects foamable resin into the three-dimensional mesh-like structure. Note that the foamable resin is preferably, for example, resin whose raw material is polyurethane resin, polystyrene resin, polyethylene resin, polypropylene resin, or the like and to which foamability is applied by generating a gas phase in the resin by vaporization of a low-boiling-point solvent or chemical reaction. Specifically, the foamable resin is preferably flexible polyurethane foam or the like.

Because the inside of the three-dimensional mesh-like structure of the three-dimensional-shaped object 2 formed by the three-dimensional shape forming apparatus 1A according to the present embodiment is filled with foamable resin, it is possible to improve the water retention capacity, as compared with the three-dimensional-shaped object 2 having only the three-dimensional mesh-like structure. Therefore, the three-dimensional shape forming apparatus 1A according to the present embodiment can form the three-dimensional-shaped object 2 that has an arbitrary outer shape, has a high water retention capacity, and is more suitable to cultivate plants. In particular, because foamable resin has a large number of pores inside and has high elasticity and therefore has a high water retention capacity, the foamable resin is preferable as material with which the inside of the three-dimensional mesh-like structure of the three-dimensional-shaped object 2 used to cultivate plants is filled.

Herein, in the present embodiment, the size of the mesh of the three-dimensional mesh-like structure of the three-dimensional-shaped object 2 may be an arbitrary size. This is because, in the present embodiment, a root and a seed of a plant is held by foamable resin and therefore the size of the mesh of the three-dimensional mesh-like structure does not need to be set on the basis of the kind of plant. Further, in the present embodiment, a pit does not need to be formed at a position at which a seed of a plant is sown in the three-dimensional mesh-like structure of the three-dimensional-shaped object 2. This is because, in the present embodiment, even in a case where a seed of a plant is sown in an inclined part of the three-dimensional-shaped object 2, the seed of the plant is held by foamable resin and the sown seed does not easily roll and move.

However, in the present embodiment, the size of the mesh of the three-dimensional mesh-like structure of the three-dimensional-shaped object 2 is preferably such that a size of mesh on a surface of the three-dimensional mesh-like structure is smaller than a size of mesh thereinside. This is because, by reducing the size of the mesh on the surface of the three-dimensional mesh-like structure, foamable resin is kept inside the three-dimensional-shaped object 2 and the foamable resin is prevented from foaming to have a shape greatly deviating from the outer shape of the three-dimensional-shaped object 2.

[2.2. Operation Example of Three-Dimensional Shape Forming System]

A method in which such a three-dimensional shape forming apparatus 1A according to the present embodiment forms a three-dimensional-shaped object will be specifically described with reference to FIGS. 14 and 15. FIGS. 14 and 15 are explanatory views for describing operation of the three-dimensional shape forming apparatus 1A according to the present embodiment.

As shown in FIG. 14, first, the three-dimensional shape forming unit 170 forms a three-dimensional-shaped object 230A by laminating layers from the bottom. Next, the resin injecting unit 191 injects unfoamed foamable resin into the three-dimensional-shaped object 230A formed to have a three-dimensional mesh-like structure. The whole three-dimensional mesh-like structure is filled with the injected foamable resin while the foamable resin is foaming, and thus the three-dimensional-shaped object 230B is formed.

In FIG. 14, the resin injecting unit 191 is, for example, a 3D printer head that injects two-liquid mixing type foamable urethane resin and includes injection ports for injecting respective two kinds of undiluted solutions of the foamable urethane resin. In such a case, the resin injecting unit 191 may inject the two kinds of undiluted solutions of the foamable urethane resin while slightly shaking so that the two kinds of undiluted solutions of the foamable urethane resin to be injected are easily mixed. Further, the resin injecting unit 191 may inject one-liquid type foamable resin or may mix two-liquid mixing type foamable resin in advance and inject the foamable resin.

Further, as shown in FIG. 15, after the foamable resin injected by the resin injecting unit 191 is solidified, the seed sowing unit 180 sows seeds 5 in the three-dimensional-shaped object 230 at optimal intervals and density for growth. Herein, the foamed foamable resin is exposed on a surface of the three-dimensional-shaped object 230B, and therefore the seeds of a plant sown by the seed sowing unit 180 are securely held at positions at which the seeds have been sown in the three-dimensional-shaped object 230B.

As described above, the three-dimensional shape forming apparatus 1A according to the present embodiment can form the three-dimensional-shaped object 2 that has an arbitrary outer shape, has a high water retention capacity because of foamable resin, and is more suitable to cultivate plants.

3. Third Embodiment

[3.1. Configuration Example of Three-Dimensional Shape Forming System]

Figure 16:
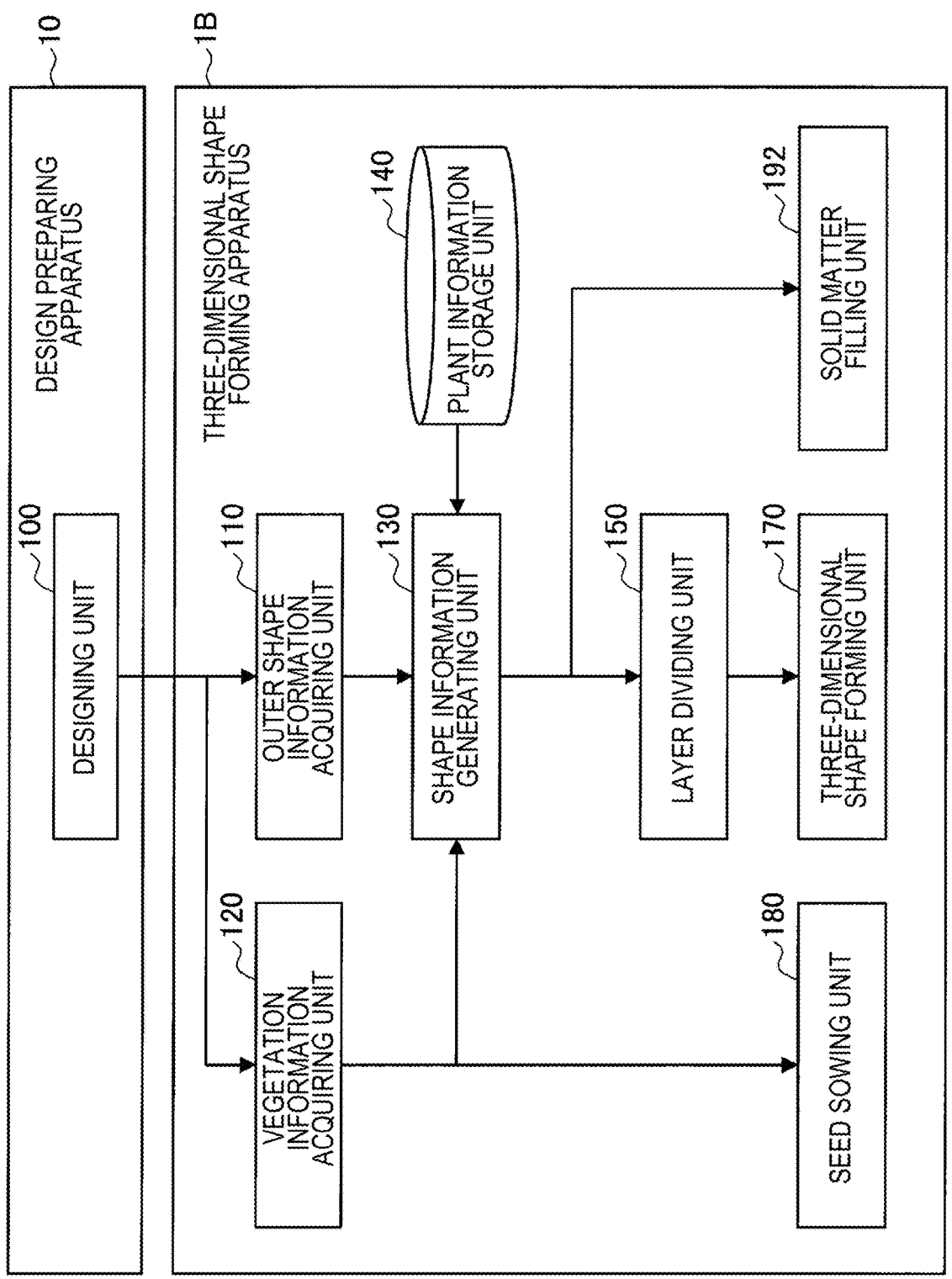
FIG. 16 is a block diagram showing an internal configuration of a three-dimensional shape forming system according to a third embodiment of the present disclosure.
Figure 17:
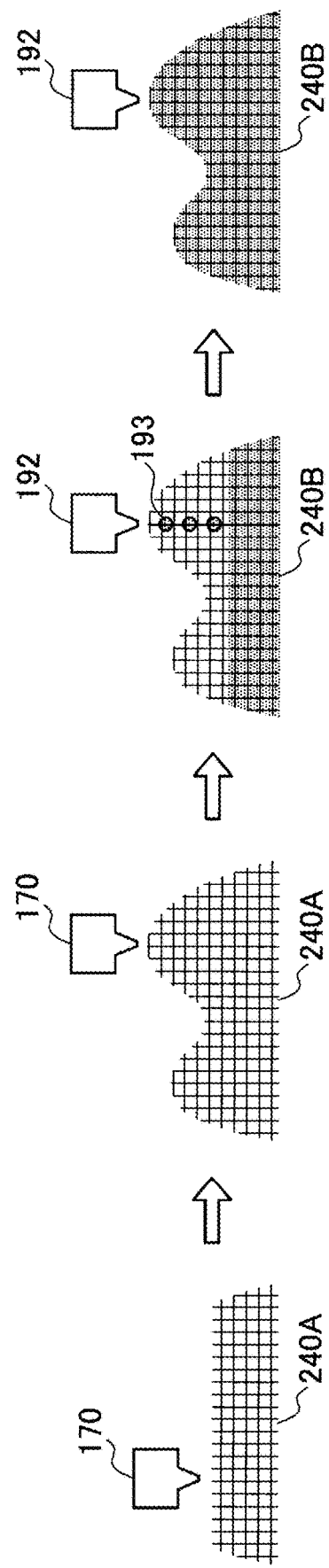
FIG. 17 is an explanatory view showing operation of the three-dimensional shape forming apparatus according to this embodiment.
Figure 18:
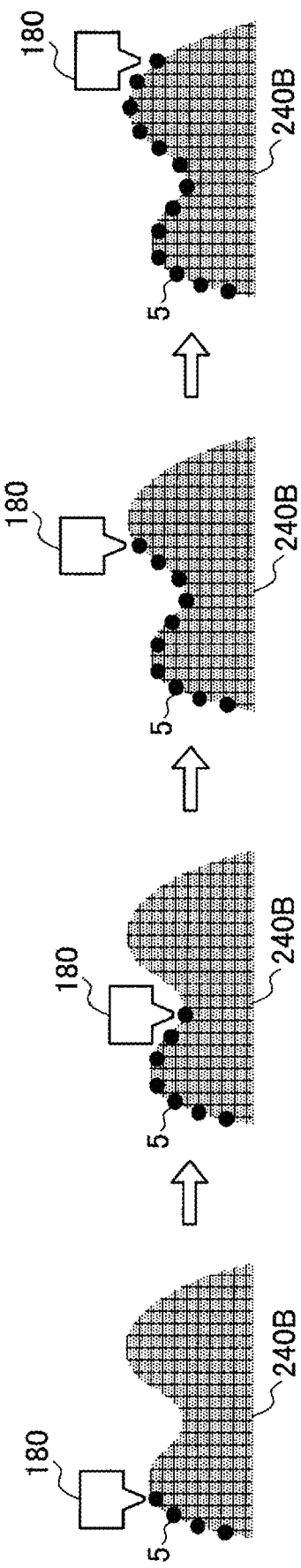
FIG. 18 is an explanatory view showing operation of the three-dimensional shape forming apparatus according to this embodiment.

Then, a three-dimensional shape forming system according to a third embodiment of the present disclosure will be described with reference to FIGS. 16 to 18. FIG. 16 is a block diagram showing an internal configuration of the three-dimensional shape forming system according to the third embodiment of the present disclosure. Further, FIGS. 17 and 18 are explanatory views showing operation of the three-dimensional shape forming apparatus according to the present embodiment.

As shown in FIG. 16, the three-dimensional shape forming system according to the present embodiment is configured to include the design preparing apparatus 10 and a three-dimensional shape forming apparatus 1B. Further, the design preparing apparatus 10 includes the designing unit 100, and the three-dimensional shape forming apparatus 1B includes the outer shape information acquiring unit 110, the vegetation information acquiring unit 120, the shape information generating unit 130, the plant information storage unit 140, the layer dividing unit 150, the three-dimensional shape forming unit 170, a solid matter filling unit 192, and the seed sowing unit 180.

Note that the three-dimensional shape forming apparatus 1B may be made up of a plurality of pieces of hardware. For example, the three-dimensional shape forming apparatus 1B may be made up of an information processing apparatus including the outer shape information acquiring unit 110, the vegetation information acquiring unit 120, the shape information generating unit 130, the plant information storage unit 140, and the layer dividing unit 150 and a printer apparatus including the three-dimensional shape forming unit 170, the solid matter filling unit 192, and the seed sowing unit 180.

The three-dimensional shape forming apparatus 1B according to the present embodiment is different from the three-dimensional shape forming system 1 according to the first embodiment in that the three-dimensional shape forming apparatus 1B further includes the solid matter filling unit 192. Hereinafter, a characteristic configuration of the three-dimensional shape forming apparatus 1B according to the present embodiment will be described, and description of a configuration substantially similar to that of the three-dimensional shape forming system 1 according to the first embodiment will be omitted.

The solid matter filling unit 192 fills the inside of the three-dimensional mesh-like structure of the three-dimensional-shaped object 2 with water-retention solid matter. For example, the solid matter filling unit 192 may be a 3D printer head that feeds water-retention solid matter to the three-dimensional mesh-like structure. Herein, the water-retention solid matter is solid matter capable of retaining water and is specifically porous solid matter such as a pumice stone, baked clay, ceramic, or silica gel. For example, the water-retention solid matter may be expanded clay (so-called hydroballs) or the like obtained by expanding and baking granular clay at a high temperature.

Note that the water-retention solid matter is preferably matter whose volume is not changed by absorbing water. This is because, in the present embodiment, the inside of the three-dimensional mesh-like structure of the three-dimensional-shaped object 2 is filled with the water-retention solid matter, and therefore, in a case where a volume of the water-retention solid matter is extremely increased by absorbing water, there is a possibility that the three-dimensional mesh-like structure of the three-dimensional-shaped object 2 is broken by the increased water-retention solid matter.

Because the inside of the three-dimensional mesh-like structure of the three-dimensional-shaped object 2 formed by the three-dimensional shape forming apparatus 1B according to the present embodiment is filled with the water-retention solid matter, it is possible to improve the water retention capacity, as compared with the three-dimensional-shaped object 2 having only the three-dimensional mesh-like structure. Therefore, the three-dimensional shape forming apparatus 1B according to the present embodiment can form the three-dimensional-shaped object 2 that has an arbitrary outer shape, has a high water retention capacity, and is more suitable to cultivate plants.

In the present embodiment, a pit may be formed at a position at which a seed of a plant is sown in the three-dimensional mesh-like structure of the three-dimensional-shaped object 2. In a case where a seed of a plant is sown in an inclined part of the three-dimensional-shaped object 2, there is a possibility that the seed of the plant rolls and moves from a position at which the seed has been sown. Therefore, by forming a pit at a position at which a seed of a plant is sown, the seed of the plant is received in the pit, which prevents the seed of the plant from rolling and moving. Further, a size of mesh of the three-dimensional mesh-like structure in the pit is preferably smaller than a size of a seed of a plant to be sown. This is because, in a case where the mesh of the three-dimensional mesh-like structure is larger than the seed of the plant, there is a possibility that the seed of the plant is not held in the three-dimensional mesh-like structure.

Further, in the present embodiment, a size of mesh on a surface of the three-dimensional mesh-like structure of the three-dimensional-shaped object 2 is preferably smaller than a size of the water-retention solid matter with which the inside of the three-dimensional mesh-like structure is filled. By reducing the size of the mesh on the surface of the three-dimensional mesh-like structure so that the size thereof is smaller than the size of the water-retention solid matter, it is possible to prevent the water-retention solid matter from leaking out of the three-dimensional-shaped object 2. Furthermore, a size of mesh inside the three-dimensional mesh-like structure of the three-dimensional-shaped object 2 is preferably larger than the size of the mesh on the surface. This is to fill the inside of the three-dimensional mesh-like structure of the three-dimensional-shaped object 2 with a greater amount of the water-retention solid matter.

Note that, in order to fill the inside of the three-dimensional mesh-like structure with the water-retention solid matter, at least one or more openings larger than the size of the water-retention solid matter are preferably provided in an upper part of the three-dimensional mesh-like structure of the three-dimensional-shaped object 2.

[3.2. Operation Example of Three-Dimensional Shape Forming System]

A method in which such a three-dimensional shape forming apparatus 1B according to the present embodiment forms a three-dimensional-shaped object will be specifically described with reference to FIGS. 17 and 18. FIGS. 17 and 18 are explanatory views for describing operation of the three-dimensional shape forming apparatus 1B according to the present embodiment.

As shown in FIG. 17, first, the three-dimensional shape forming unit 170 forms a three-dimensional-shaped object 240A by laminating layers from the bottom. Next, the solid matter filling unit 192 feeds water-retention solid matter 193 from a part above the three-dimensional-shaped object 240A formed to have a three-dimensional mesh-like structure. The inside of the three-dimensional mesh-like structure is filled with the fed water-retention solid matters 193 with no gap, and thus a three-dimensional-shaped object 240B is formed. Note that, in FIG. 17, the solid matter filling unit 192 is, for example, a 3D printer head that feeds hydroballs to the inside of the three-dimensional mesh-like structure.

Further, as shown in FIG. 18, the seed sowing unit 180 sows seeds 5, at optimal intervals and density for growth, in the three-dimensional-shaped object 240B filled with the water-retention solid matter 193 by the solid matter filling unit 192. Herein, a pit for receiving a seed of a plant may be provided in the three-dimensional mesh-like structure of the three-dimensional-shaped object 240B. In such a case, the seed sowing unit 180 sows a seed of a plant in the pit.

As described above, the three-dimensional shape forming apparatus 1B according to the present embodiment can form the three-dimensional-shaped object 2 that has an arbitrary outer shape, has a high water retention capacity because of water-retention solid matter, and is more suitable to cultivate plants.

4. Hardware Configuration

Figure 19:
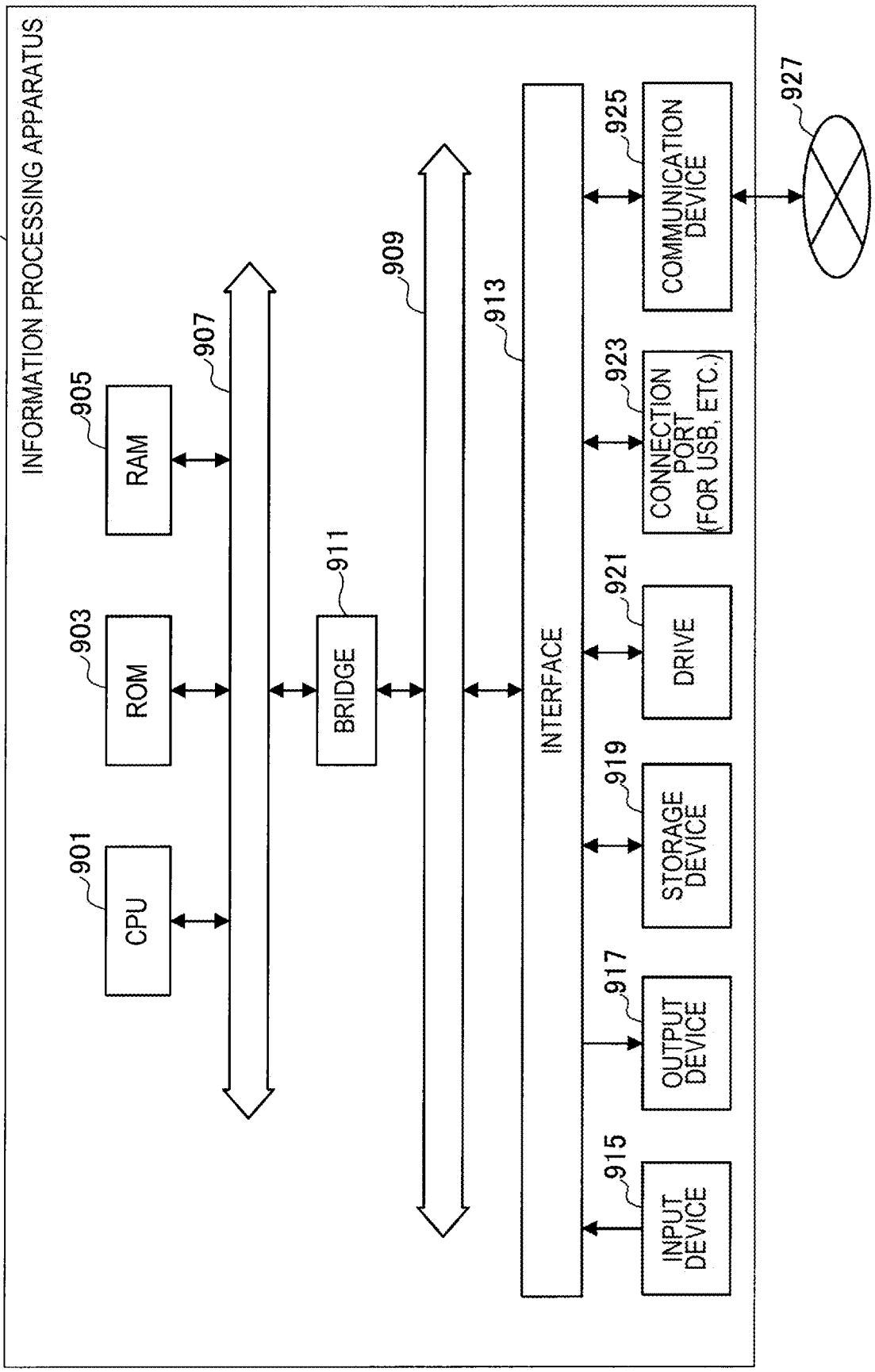
FIG. 19 is a block diagram showing an example of a hardware configuration of an information processing apparatus according to the first embodiment of the present disclosure.

Next, a hardware configuration of the information processing apparatus 11 included in the three-dimensional shape forming system according to the first embodiment of the present disclosure will be described with reference to FIG. 19. FIG. 19 is a block diagram showing an example of the hardware configuration of the information processing apparatus 11 included in the three-dimensional shape forming system according to the first embodiment of the present disclosure. Information processing executed by the information processing apparatus 11 according to the first embodiment of the present disclosure is realized by cooperation between hardware and software.

Further, information processing executed by the three-dimensional shape forming apparatuses according to the second and third embodiments of the present disclosure can also be realized by cooperation between hardware and software similar to the cooperation therebetween in the information processing apparatus 11 described below. Hardware configurations in the three-dimensional shape forming apparatuses according to the second and third embodiments of the present disclosure are similar to the hardware configuration described below, and therefore description thereof will be omitted.

As shown in FIG. 19, the information processing apparatus 11 includes, for example, a central processing unit (CPU) 901, a read only memory (ROM) 903, a random access memory (RAM) 905, a bridge 911, internal buses 907 and 909, an interface 913, an input device 915, an output device 917, a storage device 919, a drive 921, a connection port 923, and a communication device 925.

The CPU 901 functions as an arithmetic processing unit and a control device and controls the whole operation of the information processing apparatus 11 in accordance with programs stored on the ROM 903 or the like. The ROM 903 stores the programs and operation parameters used by the CPU 901, and the RAM 905 temporarily stores programs used in execution of the CPU 901, parameters appropriately changed in execution thereof, and the like. For example, the CPU 901 may function as the shape information generating unit 130 and the layer dividing unit 150. Further, the CPU 901 may further execute a function of the mixing-ratio calculation unit.

Those CPU 901, ROM 903, and RAM 905 are mutually connected via the bridge 911, the internal buses 907 and 909, and the like. Further, the CPU 901, the ROM 903, and the RAM 905 are also connected to the input device 915, the output device 917, the storage device 919, the drive 921, the connection port 923, and the communication device 925 via the interface 913.

The input device 915 is made up of, for example, an input device to which information is input, such as a touchscreen, a keyboard, a button, a microphone, a switch, or a lever, and an input control circuit for generating an input signal on the basis of input from a user and outputting the input signal to the CPU 901.

The output device 917 includes, for example, a display device such as a liquid crystal display device, an organic EL display device, and a lamp and an audio output device such as a loudspeaker and headphones. For example, the display device displays a generated image, and the audio output device converts audio data or the like into audio and outputs the audio.

The storage device 919 is a data storage device configured as an example of the storage unit of the information processing apparatus 11. The storage device 919 may include a storage medium, a storage device for storing data on the storage medium, a reading device for reading the data from the storage medium, and a deleting device for deleting the stored data. For example, the storage device 919 may function as the plant information storage unit 140.

The drive 921 is a reader/writer for a storage medium. The drive 921 reads information stored on a removable storage medium inserted into the drive 921, such as a semiconductor memory, and outputs the information to the RAM 905. Further, the drive 921 can write information into the removable storage medium.

The connection port 923 is, for example, a connection interface configured as a connection port for connecting an external connection device, such as a USB port or an optical audio terminal.

The communication device 925 is, for example, a communication interface configured as a communication device or the like to be connected to a network 927 such as a public network or a dedicated network. Further, the communication device 925 may be a communication device compatible with a wired or wireless LAN or a cable communication device for performing wired cable communication.

For example, the connection port 923 and the communication device 925 may function as the outer shape information acquiring unit 110, the vegetation information acquiring unit 120, and the output unit 160.

Further, in the hardware such as the CPU, the ROM, and the RAM, it is also possible to prepare a computer program for causing another information processing apparatus to exert functions equal to configurations forming the above-mentioned information processing apparatus 11 according to the present embodiment. Further, a storage medium on which the computer program is stored is also provided.

5. Conclusion

As described above, according to the three-dimensional shape forming system in the first embodiment of the present disclosure, it is possible to form a three-dimensional-shaped object (for example, culture medium in hydroponics) which has an arbitrary outer shape and is used to cultivate plants by forming a region where plants are cultivated so that the region has a three-dimensional mesh-like structure.

Further, according to the three-dimensional shape forming system in the second embodiment of the present disclosure, it is possible to form a three-dimensional-shaped object that has a higher water retention capacity and is suitable to cultivate plants by injecting foamable resin having a high water retention capacity into the three-dimensional mesh-like structure.

Furthermore, according to the three-dimensional shape forming system in the third embodiment of the present disclosure, it is possible to form a three-dimensional-shaped object that has a higher water retention capacity and is suitable to cultivate plants by filling the three-dimensional mesh-like structure with water-retention solid matter such as expanded clay having a high water retention capacity.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A three-dimensional shape information generating system including:

a shape information generating unit configured to generate, on the basis of outer shape information indicating an outer shape of a three-dimensional-shaped object used to cultivate a plant, shape information indicating a shape of the three-dimensional-shaped object in which at least a part of a region has a three-dimensional mesh-like structure; and an output unit configured to output the shape information to cause a three-dimensional shape forming unit to form the three-dimensional-shaped object.

(2)

The three-dimensional shape information generating system according to (1), in which the shape information generating unit changes a size of mesh of the three-dimensional mesh-like structure on the basis of a size of at least one of a root and a seed of the plant to be cultivated.

(3)

The three-dimensional shape information generating system according to (1) or (2), in which a pit in which a seed of the plant is sown is formed in the three-dimensional mesh-like structure.

(4)

The three-dimensional shape information generating system according to any one of (1) to (3), in which the region having the three-dimensional mesh-like structure is a region used to cultivate the plant.

(5)

The three-dimensional shape information generating system according to any one of (1) to (4), in which the three-dimensional-shaped object is a substitute for soil.

(6)

The three-dimensional shape information generating system according to any one of (1) to (5), in which the output unit outputs the shape information including at least information regarding shapes of layers into which the three-dimensional mesh-like structure is divided.

(7)

The three-dimensional shape information generating system according to any one of (1) to (6), further including the three-dimensional shape forming unit.

(8)

The three-dimensional shape information generating system according to any one of (1) to (7), in which the output unit further outputs vegetation information including information regarding the plant to be cultivated in the three-dimensional-shaped object and information regarding a position of a region where the plant is cultivated.

(9)

The three-dimensional shape information generating system according to (8), in which the vegetation information further includes information regarding a mixing ratio of seeds of the plant to gelled material, the mixing ratio being calculated on the basis of the information regarding the plant to be cultivated in the three-dimensional-shaped object.

(10)

The three-dimensional shape information generating system according to (8) or (9), in which the vegetation information further includes information regarding a mixing ratio of seeds of the plant to gelled material, the mixing ratio being calculated on the basis of information regarding a structure or a forming material of the three-dimensional-shaped object.

(11)

A three-dimensional shape forming apparatus including:

an outer shape information acquiring unit configured to acquire outer shape information indicating an outer shape of a three-dimensional-shaped object used to cultivate a plant;

a shape information generating unit configured to generate, on the basis of the outer shape information, shape information indicating a shape of the three-dimensional-shaped object in which at least a part of a region has a three-dimensional mesh-like structure; and a three-dimensional shape forming unit configured to form the three-dimensional-shaped object on the basis of the shape information.

(12)

The three-dimensional shape forming apparatus according to (11), further including a resin injecting unit configured to inject unfoamed foamable resin into the three-dimensional mesh-like structure and cause the foamable resin to foam in the three-dimensional mesh-like structure.

(13)

The three-dimensional shape forming apparatus according to (12), in which a size of mesh on a surface of the three-dimensional mesh-like structure is smaller than a size of mesh inside the three-dimensional mesh-like structure.

(14)

The three-dimensional shape forming apparatus according to (11), further including a solid matter filling unit configured to fill inside of the three-dimensional mesh-like structure with water-retention solid matter.

(15)

The three-dimensional shape forming apparatus according to (14), in which a size of mesh on a surface of the three-dimensional mesh-like structure is smaller than a size of the water-retention solid matter with which the inside of the three-dimensional mesh-like structure is filled.

(16)

The three-dimensional shape forming apparatus according to (14) or (15), in which a pit in which a seed of the plant is sown is formed in the three-dimensional mesh-like structure, and a size of mesh in the pit is smaller than a size of the seed of the plant.

(17)

The three-dimensional shape forming apparatus according to any one of (11) to (16), further including a seed sowing unit configured to sow a seed of the plant in the three-dimensional-shaped object.

(18)

The three-dimensional shape forming apparatus according to any one of (11) to (17), in which the three-dimensional shape forming unit forms the three-dimensional-shaped object by using additive manufacturing.

(19)

A three-dimensional shape information generating method including:

generating, by using a circuit, on the basis of outer shape information indicating an outer shape of a three-dimensional-shaped object used to cultivate a plant, shape information indicating a shape of the three-dimensional-shaped object in which at least a part of a region has a three-dimensional mesh-like structure; and outputting the shape information to cause a three-dimensional shape forming unit to form the three-dimensional-shaped object.

(20)

A program for causing a computer to function as a shape information generating unit configured to generate, on the basis of outer shape information indicating an outer shape of a three-dimensional-shaped object used to cultivate a plant, shape information indicating a shape of the three-dimensional-shaped object in which at least a part of a region has a three-dimensional mesh-like structure.

REFERENCE SIGNS LIST 1 three-dimensional shape forming system
1A, 1B three-dimensional shape forming apparatus
2 three-dimensional-shaped object
10 design preparing apparatus
11 information processing apparatus
12 printer apparatus
100 designing unit
110 outer shape information acquiring unit
120 vegetation information acquiring unit
130 shape information generating unit
140 plant information storage unit
150 layer dividing unit
160 output unit 170 three-dimensional shape forming unit
180 seed sowing unit
191 resin injecting unit
192 solid matter filling unit

The invention claimed is:

1. A three-dimensional shape information generating system comprising:
   a shape information generating unit configured to generate, on the basis of outer shape information indicating an outer shape of a three-dimensional-shaped object used to cultivate a plant, object shape information indicating a shape of the three-dimensional-shaped object and including at least a part of a region of the three-dimensional-shaped object having a three-dimensional mesh-like structure; and
   an output unit configured to output the object shape information to cause a three-dimensional shape forming unit to form the three-dimensional-shaped object, wherein the shape information generating unit changes a size of a mesh of the three-dimensional mesh-like structure based on a size of at least one of a root and a seed of the plant to be cultivated.

2. The three-dimensional shape information generating system according to claim 1,
   wherein a pit in which the seed of the plant is to be sown is formed in the three-dimensional mesh-like structure.

3. The three-dimensional shape information generating system according to claim 1,
   wherein the region having the three-dimensional mesh-like structure is a region used to cultivate the plant.

4. The three-dimensional shape information generating system according to claim 1,
   wherein the three-dimensional-shaped object is configured as a substitute for soil which otherwise would be used to cultivate the plant.

5. The three-dimensional shape information generating system according to claim 1,
   wherein the output unit outputs the object shape information including at least information regarding shapes of layers into which the three-dimensional mesh-like structure is divided.

6. The three-dimensional shape information generating system according to claim 1, further comprising the three-dimensional shape forming unit.

7. A three-dimensional shape information generating system comprising:
   a shape information generating unit configured to generate, on the basis of outer shape information indicating an outer shape of a three-dimensional-shaped object used to cultivate a plant, object shape information indicating a shape of the three-dimensional-shaped object and including at least a part of a region of the three-dimensional-shaped object having a three-dimensional mesh-like structure; and
   an output unit configured to output the object shape information to cause a three-dimensional shape forming unit to form the three-dimensional-shaped object, wherein the output unit further outputs vegetation information including information regarding the plant to be cultivated in the three-dimensional-shaped object and information regarding a position of the region where the plant is cultivated.

8. The three-dimensional shape information generating system according to claim 7,
   wherein the vegetation information further includes information regarding a mixing ratio of seeds of the plant to gelled material, the mixing ratio being calculated on the basis of the information regarding the plant to be cultivated in the three-dimensional-shaped object.

9. The three-dimensional shape information generating system according to claim 7,
   wherein the vegetation information further includes information regarding a mixing ratio of seeds of the plant to gelled material, the mixing ratio being calculated on the basis of information regarding a structure or a forming material of the three-dimensional-shaped object.

10. A three-dimensional shape forming apparatus comprising:
    an outer shape information acquiring unit configured to acquire outer shape information indicating an outer shape of a three-dimensional-shaped object used to cultivate a plant;
    a shape information generating unit configured to generate, on the basis of the outer shape information, object shape information indicating a shape of the three-dimensional-shaped object and including at least a part of a region of the three-dimensional-shaped object having a three-dimensional mesh-like structure;
    a three-dimensional shape forming unit configured to form the three-dimensional-shaped object on the basis of the object shape information; and
    a resin injecting unit configured to inject unfoamed foamable resin into the three-dimensional mesh-like structure and cause the foamable resin to foam in the three-dimensional mesh-like structure.

11. The three-dimensional shape forming apparatus according to claim 10,
    wherein a size of mesh on a surface of the three-dimensional mesh-like structure is smaller than a size of mesh inside the three-dimensional mesh-like structure.

12. The three-dimensional shape forming apparatus according to claim 10, further comprising
    a solid matter filling unit configured to fill inside of the three-dimensional mesh-like structure with water-retention solid matter.

13. The three-dimensional shape forming apparatus according to claim 12,
    wherein a size of mesh on a surface of the three-dimensional mesh-like structure is smaller than a size of the water-retention solid matter with which the inside of the three-dimensional mesh-like structure is filled.

14. The three-dimensional shape forming apparatus according to claim 12,
    wherein a pit in which a seed of the plant is to be sown is formed in the three-dimensional mesh-like structure, and a size of mesh in the pit is smaller than a size of the seed of the plant.

15. The three-dimensional shape forming apparatus according to claim 10, further comprising
    a seed sowing unit configured to sow a seed of the plant in the three-dimensional-shaped object.

16. The three-dimensional shape forming apparatus according to claim 10,
    wherein the three-dimensional shape forming unit forms the three-dimensional-shaped object by using additive manufacturing.

17. A three-dimensional shape information generating method comprising:
    generating, by using a circuit, on the basis of outer shape information indicating an outer shape of a three-dimensional-shaped object used to cultivate a plant, object shape information indicating a shape of the three-dimensional-shaped object and including at least a part of a region of the three-dimensional-shaped object having a three-dimensional mesh-like structure; and outputting the object shape information to cause a three-dimensional shape forming unit to form the three-dimensional-shaped object, wherein a size of a mesh of the three-dimensional mesh-like structure is changed based on of a size of at least one of a root and a seed of the plant to be cultivated.

18. A non-transitory computer readable medium containing instructions that, when executed by a processor, implement:

a shape information generating unit configured to generate, on the basis of outer shape information indicating an outer shape of a three-dimensional-shaped object used to cultivate a plant, object shape information indicating a shape of the three-dimensional-shaped object and including at least a part of a region of the three-dimensional-shaped object having a three-dimensional mesh-like structure, wherein the shape information generating unit changes a size of a mesh of the three-dimensional mesh-like structure based on a size of at least one of a root and a seed of the plant to be cultivated.

* * * * *